(12) United States Patent
Hill et al.

(10) Patent No.: US 8,217,917 B2
(45) Date of Patent: *Jul. 10, 2012

(54) TOUCH SENSING WITH TOUCH DOWN AND LIFT OFF SENSITIVITY

(75) Inventors: Nicholas P. R. Hill, Cambridge (GB); Darius M. Sullivan, Cambridge (GB)

(73) Assignee: 3M Innovative Properties Company, Saint Paul, MN (US)

( * ) Notice: Subject to any disclaimer, the term of this patent is extended or adjusted under 35 U.S.C. 154(b) by 1310 days.

This patent is subject to a terminal disclaimer.

(21) Appl. No.: 11/865,237

(22) Filed: Oct. 1, 2007

(65) Prior Publication Data

US 2008/0018618 A1 Jan. 24, 2008

Related U.S. Application Data

(63) Continuation of application No. 10/750,291, filed on Dec. 31, 2003, now Pat. No. 7,277,087.

(51) Int. Cl.
*G09G 5/00* (2006.01)
(52) U.S. Cl. ...... 345/177; 345/173; 345/176; 178/18.04
(58) Field of Classification Search .......... 345/173–179; 178/18.01–18.09
See application file for complete search history.

(56) References Cited

U.S. PATENT DOCUMENTS

| | | | |
|---|---|---|---|
| 4,599,607 A | 7/1986 | Hill | |
| 5,637,839 A | 6/1997 | Yamaguchi et al. | |
| 6,091,406 A | 7/2000 | Kambara et al. | |
| 6,871,149 B2 | 3/2005 | Sullivan et al. | |
| 7,157,649 B2 | 1/2007 | Hill | |
| 7,176,902 B2 | 2/2007 | Peterson, Jr. et al. | |
| 7,184,898 B2 | 2/2007 | Sullivan et al. | |
| 7,277,087 B2 * | 10/2007 | Hill et al. | 345/173 |
| 7,315,300 B2 * | 1/2008 | Hill et al. | 345/173 |
| 2001/0006006 A1 * | 7/2001 | Hill | 73/606 |
| 2003/0217873 A1 * | 11/2003 | Paradiso et al. | 178/18.04 |
| 2004/0233174 A1 | 11/2004 | Robrecht et al. | |
| 2005/0078093 A1 * | 4/2005 | Peterson et al. | 345/173 |
| 2007/0118305 A1 | 5/2007 | Sullivan et al. | |

FOREIGN PATENT DOCUMENTS

| | | |
|---|---|---|
| KR | 2000-0029978 | 5/2000 |
| WO | WO 98/07127 | 2/1998 |
| WO | WO 01/48684 | 7/2001 |
| WO | WO 03/005292 | 1/2003 |

* cited by examiner

*Primary Examiner* — Quan-Zhen Wang
*Assistant Examiner* — Jennifer Nguyen
(74) *Attorney, Agent, or Firm* — Steven A. Bern

(57) ABSTRACT

A touch sensing device includes a plurality of sensors and an emitting transducer coupled to a touch panel. The transducer induces bending waves in the touch panel. The sensors sense bending waves in the touch panel and generate a bending wave signal responsive to the sensed bending waves. A controller identifies an untouched condition signal responsive to the induced bending waves. The controller compares the untouched condition signal to the bending wave signal, and detects a touch on the touch panel based on the comparison.

19 Claims, 24 Drawing Sheets

TOUCH SENSING WITH TOUCH DOWN AND LIFT OFF SENSITIVITY

CROSS REFERENCE TO RELATED APPLICATIONS

This application is a continuation application of U.S. application Ser. No. 10/750,291, filed Dec. 31, 2003, U.S. Pat. No. 7,277,087 allowed.

FIELD OF THE INVENTION

This invention relates to touch input devices. In particular, the invention relates to touch input devices that use information from vibrations in the touch panel to determine the information about a touch on a touch panel.

BACKGROUND

Electronic displays are widely used in all aspects of life. Although in the past the use of electronic displays has been primarily limited to computing applications such as desktop computers and notebook computers, as processing power has become more readily available, such capability has been integrated into a wide variety of applications. For example, it is now common to see electronic displays in a wide variety of applications such as teller machines, gaming machines, automotive navigation systems, restaurant management systems, grocery store checkout lines, gas pumps, information kiosks, and hand-held data organizers to name a few.

Interactive visual displays often include some form of touch sensitive screen. Integrating touch sensitive panels with visual displays is becoming more common with the emergence of next generation portable multimedia devices. One popular touch detection technology, referred to as Surface Acoustic Wave (SAW), uses high frequency waves propagating on the surface of a glass screen. Attenuation of the waves resulting from contact of a finger with the glass screen surface is used to detect touch location. SAW employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

SUMMARY OF THE INVENTION

The present invention involves touch sensitive devices and systems implementing touch sensing methods for touch down and/or lift off detection. In accordance with one embodiment of the invention, a touch sensing device includes a touch panel, a transducer coupled to the touch panel and configured to induce bending waves in the touch panel and a plurality of sensors coupled to the touch panel and configured to sense bending waves in the touch panel and produce a bending wave signal responsive to the sensed bending waves.

The touch sensing device further includes a controller coupled to the plurality of sensors. The controller is configured to identify an untouched condition signal responsive to the bending waves induced by the transducer. The controller is further configured to compare the untouched condition signal to the bending wave signal and detect a touch on the touch panel based on the comparison.

Another embodiment of the invention is directed to a touch screen system including a touch screen, a display for displaying information viewable through the touch screen, and a processor coupled to the display and configured to process information displayed on the display.

The touch screen includes a touch panel, a transducer coupled to the touch panel, a plurality of sensors coupled to the touch panel, and a controller coupled to the plurality of sensors. The transducer is configured to induce bending waves in the touch panel. The plurality of sensors is configured to sense bending waves in the touch panel and generate a bending wave signal responsive to the sensed bending waves. The controller is configured to identify an untouched condition signal responsive to the induced bending waves and detect the touch on the touch panel based on a difference between the bending wave signal and the untouched condition signal.

A further embodiment of the invention is directed to a method of touch detection. The method involves inducing bending waves in a touch panel using a driving signal. An untouched condition signal responsive to the induced bending waves is identified. A bending wave signal responsive to a touch on the touch panel is generated. The bending wave signal is compared the untouched condition signal. The touch on the touch panel is detected based on the comparison.

Yet another embodiment of the invention is directed to a method for detecting touch lift off. The method includes inducing bending waves in a touch panel using a driving signal and identifying an untouched condition signal responsive to the induced bending waves. A touch on the touch panel generates a bending wave signal responsive to the touch. After a touch is detected, the bending wave signal is compared to the untouched condition signal. Touch lift off is detected based on the comparison.

In a further embodiment of the invention, a touch sensing method involves detecting a touch on a touch panel by one or more of a plurality of touch detection processes. At least one of the plurality of touch detection processes based on a bending wave induced in the touch panel by a driving signal. A touch location process is initiated after detecting the touch.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1b graphically shows the frequency response of the dispersive impulse response of FIG. 1a obtained by taking the Fourier Transform of the impulse response of FIG. 1a;

Figure 1A:
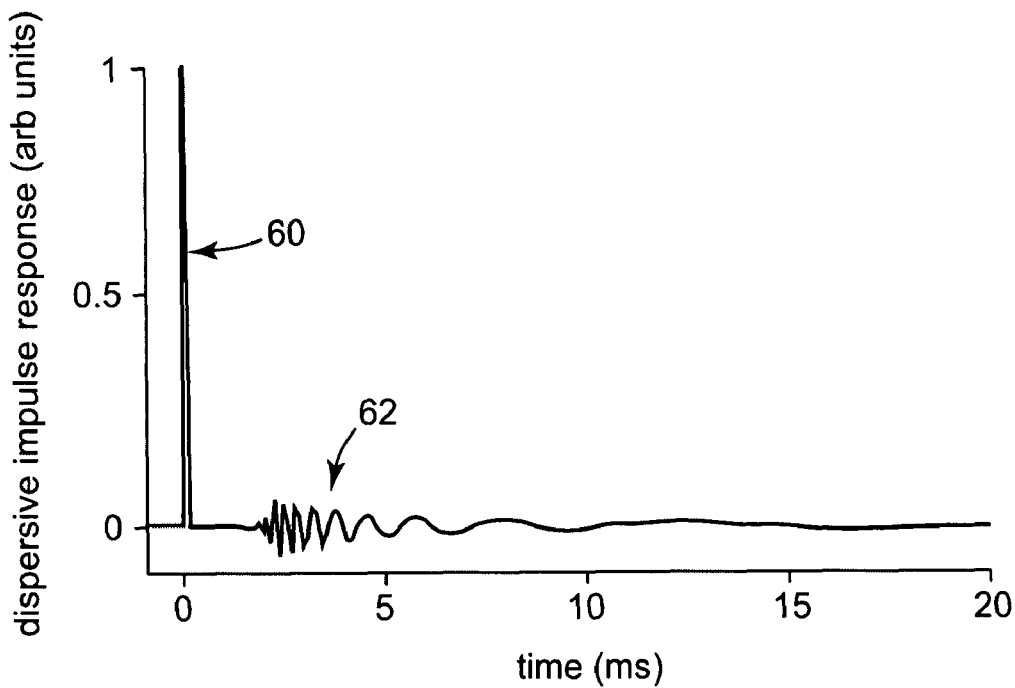
FIG. 1a graphically shows an impulse response in an ideal medium with a square root dispersion relation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

The present invention relates to touch activated, user interactive devices that sense vibrations that propagate through a touch substrate for sensing by a number of touch transducers. More particularly, the present invention relates to a bending wave vibration touch sensing apparatus that, in addition to employing pickup sensors, includes at least one excitation transducer. Cooperative use of the pickup sensors and excitation transducer provides for a number of enhanced operational and diagnostic capabilities. Such capabilities include, for example, performing a plate calibration procedure that provides useful information concerning the touch substrate, such as relative or absolute plate dimensions. Another capability is directed to pickup sensor calibration, in which differences in sensor phase response are determined, and corrections are made to the measured bending wave signals to accommodate such differences in sensor phase response.

A further capability realizable through cooperative use of pickup sensors and an excitation transducer of a touch sensing apparatus concerns detection of changes in touch sensing apparatus performance and tracking changes in same over time. Subtle and dramatic changes in touch sensing apparatus performance may be detected and tracked. Information concerning touch sensing apparatus status and performance changes may be stored locally and/or accessed by a remote system. A number of self-diagnostic processes may be implemented to correct for less severe changes in performance (locally and/or remotely), and maintenance information/warning messages may be generated in response to detection of significant changes in touch sensing apparatus performance. Other capabilities include enhanced lift-off detection, improved sensitivity to light touches, and improved wake-on-touch functionality.

These and other advantageous features and capabilities are described below in greater detail. A touch sensing apparatus implemented in accordance with the present invention may incorporate one or more of the features, structures, methods, or combinations thereof described herein. It is intended that such a device or method need not include all of the features and functions described herein, but may be implemented to include selected features and functions that, in combination, provide for unique structures and/or functionality.

In vibration sensing touch input devices that include piezoelectric sensors, for example, vibrations propagating in the plane of the touch panel plate stress the piezoelectric sensors, causing a detectable voltage drop across the sensor. The signal received can be caused by a vibration resulting directly from the impact of a direct touch input or the input of energy with a trace (friction), or by a touch input influencing an existing vibration, for example by attenuation of the vibration. The signal received can also be caused by an unintended touch input, such as a touch input resulting from user handling or mishandling of the touch input device, or from environmental sources external to, but sensed by, the touch input device.

According to one touch sensing approach, upon receiving a signal indicative of a direct touch, for example, the differential times at which the same signal is received at each of the sensors can be used to deduce the location of the touch input. When the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Such a technique is particularly suited to systems that detect bending wave vibrations.

Techniques for addressing vibration wave packet dispersion and producing representative signals corrected for such dispersion are disclosed in International Publications WO 2003/005292 and WO 01/48684; U.S. patent application Ser. No. 09/746,405 filed Dec. 26, 2000; U.S. Provisional Application 60/432,024 filed Dec. 10, 2002; and in commonly owned U.S. patent application Ser. No. 10/440,650, each of which is incorporated herein by reference.

The term bending wave vibration refers to an excitation, for example by the contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves.

For purposes of enhancing an understanding of vibration wave packet dispersion and producing representative signals corrected for such dispersion, reference is made to FIGS. 1a-1d. FIG. 1a shows an impulse in an ideal medium with a square root dispersion relation and demonstrates that a dispersive medium does not preserve the waveshape of an impulse. The outgoing wave 60 is evident at time t=0 and the echo signal 62 is spread out over time, which makes a determination of an exact contact position problematic.

In a non-dispersive medium such as air, a periodic variation of the frequency response is characteristic of a reflection, and is often referred to as comb filtering. Physically, the periodic variation in the frequency response derives from the number of wavelengths that fit between the source and the reflector. As the frequency is increased and the number of wavelengths fitting in this space increases, the interference of the reflected wave with the outgoing wave oscillates between constructive and destructive.

Figure 1B:
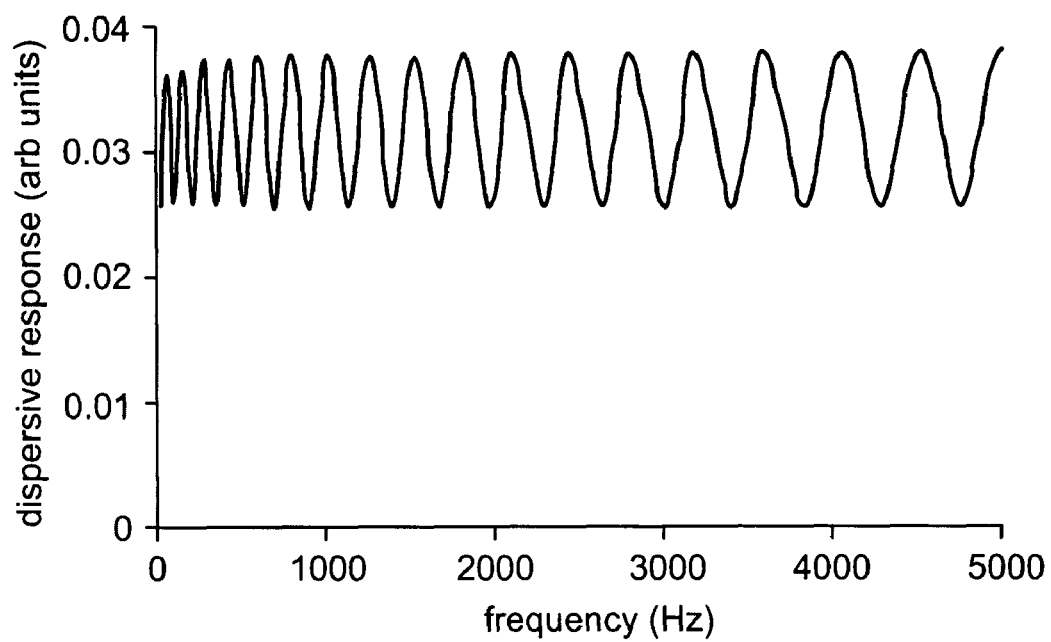

Calculating the Fourier transform of the dispersive impulse response of FIG. 1a produces the frequency response shown in FIG. 1b. The frequency response is non-periodic and the periodic variation with wavelength translates to a variation in frequency that gets slower with increasing frequency. This is a consequence of the square root dispersion in which the wavelength is proportional to the square root of the inverse of frequency. The effect of the panel on the frequency response is therefore to stretch the response as a function of frequency according to the panel dispersion. Consequently, a correction for the panel dispersion may be applied by applying the inverse stretch in the frequency domain, thus restoring the periodicity present in the non-dispersive case.

By warping the frequency axis with the inverse of the panel dispersion, FIG. 1b may be transformed into the frequency response for the non-dispersive case (FIG. 1c) in which the frequency of excitation is proportional to the inverse of the wavelength. This simple relationship translates the periodic variation with decreasing wavelength to a periodic variation with increasing frequency as shown in FIG. 1c.

Figure 1C:
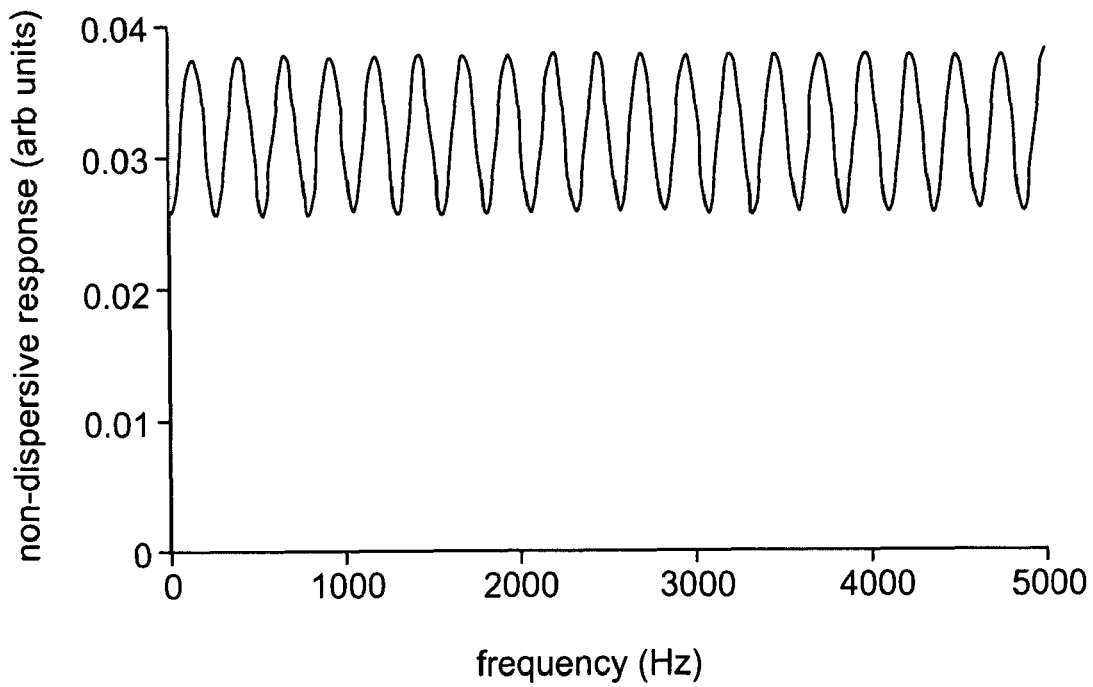
FIG. 1c graphically shows a dispersion corrected transformation of the dispersive frequency response shown in FIG. 1b obtained by warping the frequency axis with the inverse of the touch panel dispersion.
Figure 1D:
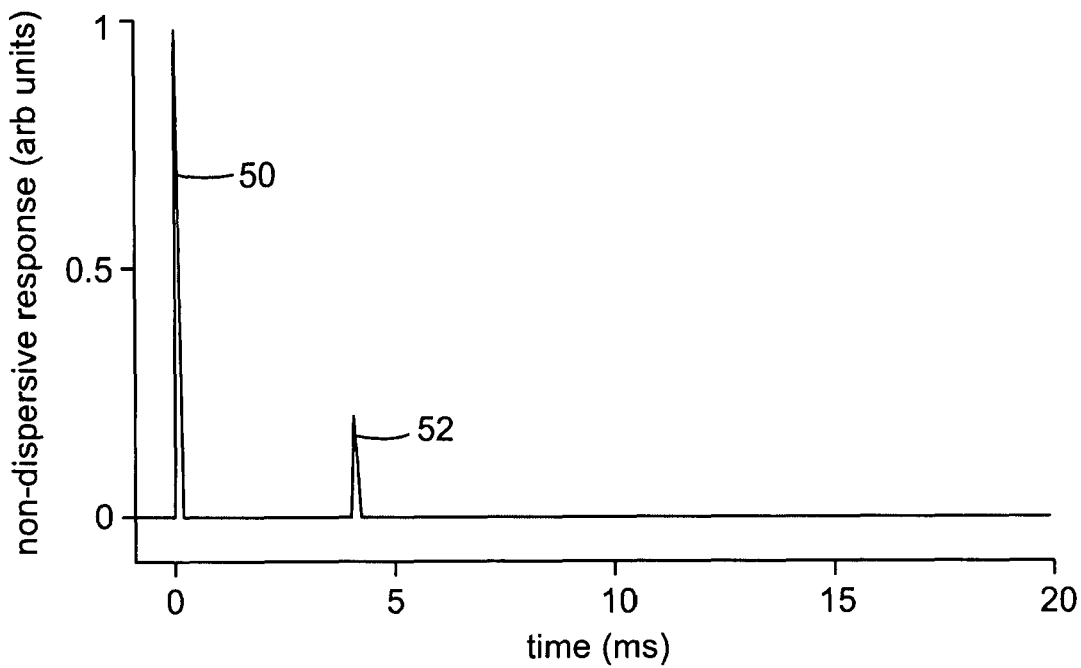
FIG. 1d shows a non-dispersive impulse response produced by applying the inverse Fast Fourier Transform (FFT) to the trace of FIG. 1c, which has been corrected for dispersion.

Applying the inverse Fast Fourier Transform (FFT) to the trace of FIG. 1c produces an impulse response shown in FIG. 1d, which is corrected for dispersion and where the clear reflection is restored. As is shown in FIG. 1d, any particular waveshape of an impulse is preserved in time since the waves traveling in a non-dispersive medium have a constant velocity of travel, independent of their frequency. Accordingly, the task of echo location is relatively straight forward. The outgoing wave 50 is evident at time t=0, together with a clear reflection 52 at 4 ms. The reflection 52 has a magnitude that is approximately one-quarter of the magnitude of the outgoing wave 50.

It is noted that the procedure described above is not applicable if the impulse has occurred at an unknown time $t_0$ and the distance x from the response to an initial impulse may only be calculated if the impulse occurs at $t_0=0$. A dispersion corrected correlation function may be employed in situations where the precise time, $t_0$, at which a contact occurred is not known. According to one approach, a first sensor mounted on a structure capable of supporting bending waves measures a first measured bending wave signal. A second sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated PCT application 01/48684 and U.S. patent application Ser. No. 09/746,405.

Figure 2:
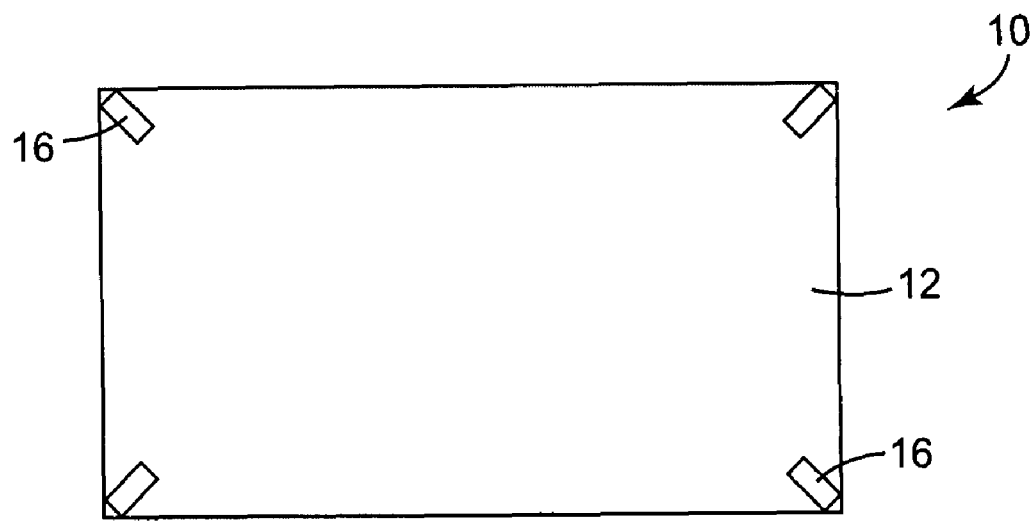
FIG. 2 illustrates one configuration of a touch sensitive device that incorporates features and functionality for detecting bending wave vibrations in accordance with an embodiment of the present invention.

Turning now to FIG. 2, there is illustrated one configuration of a touch sensitive device 10 that incorporates features and functionality for detecting bending wave vibrations. According to this embodiment, the touch sensitive device 10 includes a touch substrate 12 and vibration sensors 16 coupled to an upper surface of the touch substrate 12. In this illustrative example, the upper surface of the touch substrate 12 defines a touch sensitive surface. Although sensors 16 are shown coupled to the upper surface of the touch substrate 12, the sensors 16 can alternatively be coupled to the lower surface of the touch substrate 12. In another embodiment, one or more sensors 16 may be coupled to the upper surface while one or more other sensors 16 may be coupled to the lower surface of the touch substrate 12.

Touch substrate 12 may be any substrate that supports vibrations of interest, such as bending wave vibrations. Exemplary substrates 12 include plastics such as acrylics or polycarbonates, glass, or other suitable materials. Touch substrate 12 can be transparent or opaque, and can optionally include or incorporate other layers or support additional functionalities. For example, touch substrate 12 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 10 includes at least three sensors 16 to determine the position of a touch input in two dimensions, and four sensors 16 may be desirable in some embodiments, as discussed in International Publications WO 2003 005292 and WO 0148684, and in U.S. patent application Ser. No. 09/746,405. In the present invention, sensors 16 are preferably piezoelectric sensors that can sense vibrations indicative of a touch input to touch substrate 12.

Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 10 include electrostrictive, magnetostrictive, piezoresistive, acoustic, and moving coil transducers/devices, among others.

In one embodiment, all of the sensors 16 are configured to sense vibrations in the touch substrate 12. In another embodiment, one or more of the sensors 16 can be used as an emitter device to emit a signal that can be sensed by the other sensors 16 to be used as a reference signal or to create vibrations that can be altered under a touch input, such altered vibrations being sensed by the sensors 16 to determine the position of the touch. An electrodynamic transducer may be used as a suitable emitter device. Moreover, one or more of the sensors 16 can be configured as a dual purpose sense and excitation transducer. Sensors 16 can be affixed or bonded to touch substrate 12 by any suitable means, such as by use of an adhesive.

When the touch sensitive device 10 is operating with an active sensor 16, i.e. with an emitting transducer generating an excitation signal, a contact on the touch substrate 12 may exert a non-linear force on the touch substrate 12 so as to generate harmonics of the excitation signal. Signal processing may be used to isolate the excitation signal from the harmonics so that the harmonics may used to determine the contact position in a manner similar to passive sensing. The harmonics effectively constitute a source of bending waves from the contact site.

In a configuration in which the touch sensitive device 10 employs a dual active and passive sensor 16, this sensor 16 may be adapted to switch between active and passive sensing modes depending on whether contact is applied to the touch substrate 12. The touch sensitive device 10 may cycle between resting in passive sensing mode when no contact is detected, switching to active mode sensing when a contact is applied, and returning to passive sensing mode once the contact is removed to await further contacts. This may be advantageous to avoid power drain when the touch sensitive device 10 is unnecessarily in active mode.

Many applications that employ touch sensitive devices 10 also use electronic displays to display information through the touch sensitive devices 10. Since displays are typically rectangular, it is typical and convenient to use rectangular touch sensitive devices 10. As such, the touch substrate 12 to which the sensors 16 are affixed is typically rectangular in shape. Alternatively, the touch substrate 12 may have a more complex shape, for example a curved surface and/or variable thickness. In the case of touch substrate 12 having a complex shape, an adaptive algorithm (e.g., neural net) may be used to decipher the contact location from the bending wave signals received by the sensors 16.

According to one configuration, the sensors 16 are preferably placed near the corners of the touch substrate 12. Because many applications call for a display to be viewed through the touch sensitive devices 10, it is desirable to place the sensors near the edges of the touch substrate 12 so that they do not undesirably encroach on the viewable display area. Placement of the sensors 16 at the corners of a touch substrate 12 can also reduce the influence of reflections from the panel edges.

The contact sensed by the touch sensitive device 10 may be in the form of a touch from a stylus, which may be in the form of a hand-held pen. The movement of a stylus on the touch substrate 12 may generate a continuous signal, which is affected by the location, pressure and speed of the stylus on the touch substrate 12. The stylus may have a flexible tip, e.g. of rubber, which generates bending waves in the touch substrate 12 by applying a variable force thereto. The variable force may be provided by the tip, which alternatively adheres to or slips across a surface of the touch substrate 12. Alternatively, the contact may be in the form of a touch from a finger that may generate bending waves in the touch substrate 12, which may be detected by passive and/or active sensing. The bending waves may have frequency components in the ultrasonic region (>20 kHz).

Figure 3:
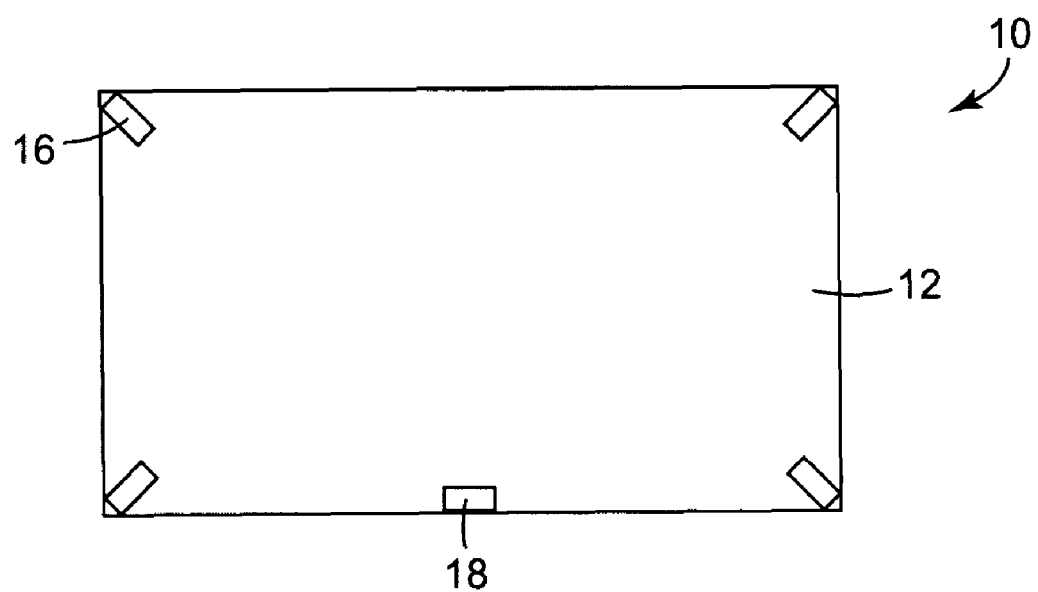
FIG. 3 illustrates another configuration of a touch sensitive device that incorporates pickup sensors and an excitation transducer in accordance with an embodiment of the present invention.

FIG. 3 illustrates another configuration of a touch sensitive device 10 in accordance with an embodiment of the present invention. According to this embodiment, the touch sensitive device 10 includes a number of sensors 16 for sensing bending wave vibrations in the touch substrate 12. The touch sensitive device 10 further includes an excitation transducer 18. The excitation transducer 18 is preferably a "dedicated" transducer 18, in that it is typically not used in normal touch location computations. Rather, normal touch location computations are made using pickup sensors 16. It is understood that excitation transducer 18 may be an emitting transducer or a dual emitter/sensor transducer. In a configuration in which excitation transducer 18 is configured as a dual emitter/sensor transducer, the dual mode transducer is typically not involved in normal touch location determination operations. Use of a dedicated excitation transducer 18 provides the opportunity to perform a variety of functions not readily possible using a conventional sensor/transducer topology.

In the configuration shown in FIG. 3, four sensors 16 are used as vibration pickups. These transducers 16 are preferably optimized for sensitivity to low levels of vibration associated with a light touch. Connection to these transducers 16 may be made with a printed electrode pattern. In addition to their operation as vibration pickups, when a voltage is applied to the sensors 16, energy is transferred into the plate, resulting in generation of bending waves. As such, a sensor 16 can, as discussed above, operate as both a vibration pickup sensor and a bending wave generator. However, the use of a given sensor 16 as a transducer for both vibration pickup and active excitation of the substrate 12 has a number of drawbacks.

One drawback is the inability of a single sensor 16 to operate as both a pickup and an emitter simultaneously. When the sensors 16 are being used as emitters driven by a stimulus, for example, they can not readily be used as simultaneous pickups. The functionality of the substrate 12 in pickup mode is therefore likely to either be impaired or only possible in a multiplexed fashion.

In a configuration that incorporates a buffer circuit between a given sensor 16 and associated sense circuitry, as will be discussed below, such a buffer circuit provides a barrier to the application of a voltage to the sensor 16 when operating as a pickup transducer. Although the buffer circuit may be placed in a reverse bias condition, in which case a voltage applied to the external connections to the substrate 12 is applied directly to the sensor 16, the voltage range over which this may be accomplished in a linear fashion is fairly limited. Also, this approach requires additional circuitry at the controller to which the touch sensitive device 10 is communicatively coupled.

To overcome these and other deficiencies associated with conventional touch sensitive device implementations, a transducer arrangement according to an embodiment of the present invention, and as shown in FIG. 3, incorporates at least one dedicated excitation transducer 18 that provides for active generation of bending waves in the substrate 12. Generation of bending waves may be used to provide for a number of performance improvements and diagnostic features, examples of which are described herein.

Figure 4:
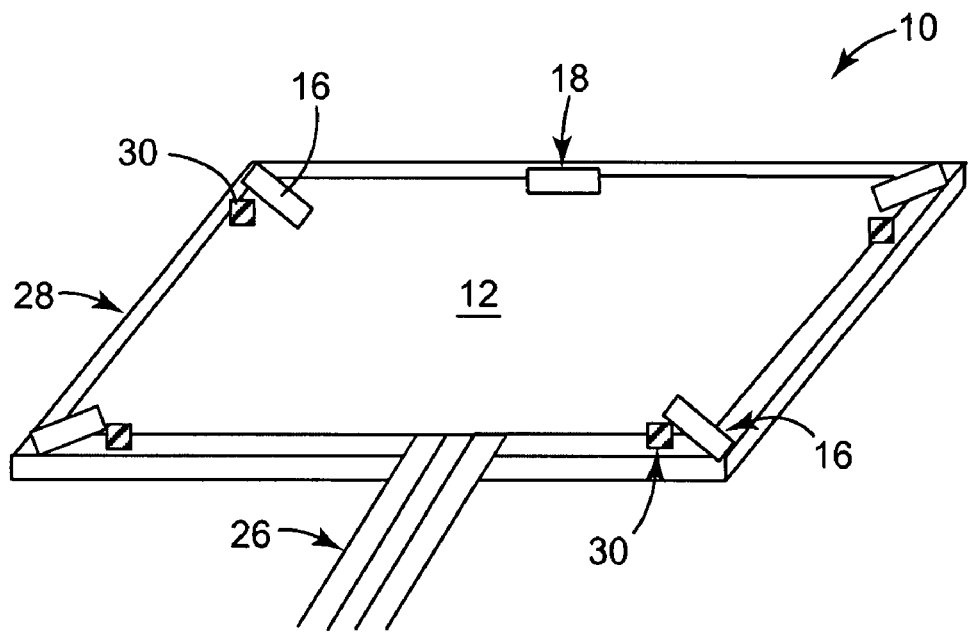
FIG. 4 shows a configuration of a touch sensitive device that incorporates an excitation transducer and pickup sensors coupled to buffer circuits in accordance with an embodiment of the present invention.

Turning now to FIG. 4, there is shown an embodiment of a touch sensitive device 10 in accordance with the present invention. In this embodiment, four sensors 16 are situated at the four corners of the substrate 12. A fifth transducer, an excitation transducer 18, is positioned along an edge of substrate 12 preferably equidistant between two adjacent sensors 16 situated proximate the same edge of the substrate 12. It will be appreciated that the excitation transducer 18 may be positioned at substrate locations other than that shown in FIG. 4. Each of the four sensors 16 and the excitation transducer 18 is connected to respective conductors that are routed to a tail connector 26. A printed electrode pattern may be used as the conductors, as noted above.

FIG. 4 further shows a buffer circuit 30 associated with each of the four corner sensors 16. A buffer circuit 30 may be situated on the substrate 12 adjacent to each sensor 16 to buffer the signals produced by the sensor 16 in response to sensed bending wave vibrations propagating in the substrate 12. Inclusion of the buffer circuits 30 provides several benefits, including increasing the signal to noise ratio of the sensors 16 and reducing the level of EMI interference from the environment. It is desirable that the buffer circuits 30 be situated in close proximity to the sensors 16, as shown in FIG. 4. However, the buffer circuits 30 may be situated elsewhere on the substrate 12 if desired, and may alternatively be integrated into the tail connector 26.

Figure 5:
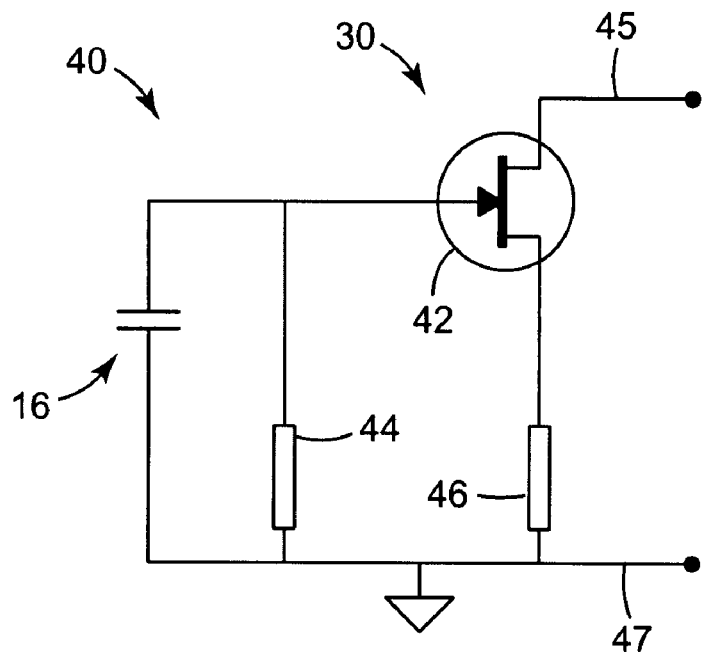
FIG. 5 is a schematic of a buffer circuit configuration suitable for use in the device embodiment shown in FIG. 4.

Each of the buffer circuits 30 includes an amplification circuit, such as that shown in FIG. 5. According to the simplified circuit configuration shown in FIG. 5, buffer circuit 30 includes a transistor 42, such as a field effect transistor (FET), having a base coupled in parallel to a pickup sensor 16 and a resistor 44. The drain of the FET 42, shown as an n-channel JFET (e.g., FET-J-N SST310), is coupled to a first conductor 45. The source of the FET 42 is coupled to a second conductor 47 via resistor 46. Conductors 45 and 47 are coupled to a controller of the touch sensitive device 10. It is noted that other components (not shown) are required off-substrate to properly bias the FET 42. Typical off-substrate components include a power supply, bias resistor, and a capacitive coupling to the analog input of the controller of the touch sensitive device 10.

In the configuration shown in FIG. 5, the pickup sensor 16 is wired such that it is referenced to ground. It will be appreciated that, in an alternative embodiment, the pickup sensor 16 may be wired to provide a differential input to a balanced amplifier, such as a balanced on-board amplifier (e.g., buffer circuit amplifier) or off-board amplifier (e.g., sense amplifier of a touch panel controller). According to this embodiment, each pickup sensor 16 is connected to a balanced input of an amplifier via two balanced wires. The balanced amplifier may be an on-board or off-board amplifier.

In one configuration, each pickup sensor 16 is connected to an off-board balanced amplifier via twisted pair conductors, and an on-board FET 42 need not be used. In another configuration, each pickup sensor 16 is connected to a balanced input of a FET 42 via two balanced wires, and a differential output of the FET 42 is connected to a balanced input of an off-board amplifier via twisted pair conductors. Use of balanced amplifiers according to this embodiment provides for differential pickup sensor voltage measurements. This configuration may provide for improved cancellation of certain sensor signal noise via common mode rejection afforded by differential pickup sensor voltage measurements.

For purposes of illustration, each of the sensors 16 shown in FIG. 4 is oriented approximately 45 degrees relative to the edges of the substrate 12. In addition, one buffer circuit 30 is mounted adjacent to each corner sensor 16. According to one touch sensitive device implementation, the substrate comprises a glass plate having length, width, and thickness dimensions of L=324 mm, W=246 mm, and T=2.2 mm, respectively. In each of the four corners of the substrate 12, a piezoelectric transducer 16 is situated having length, width, and thickness dimensions of L=7 mm, W=3 mm, and T=1 mm, respectively.

Figure 6:
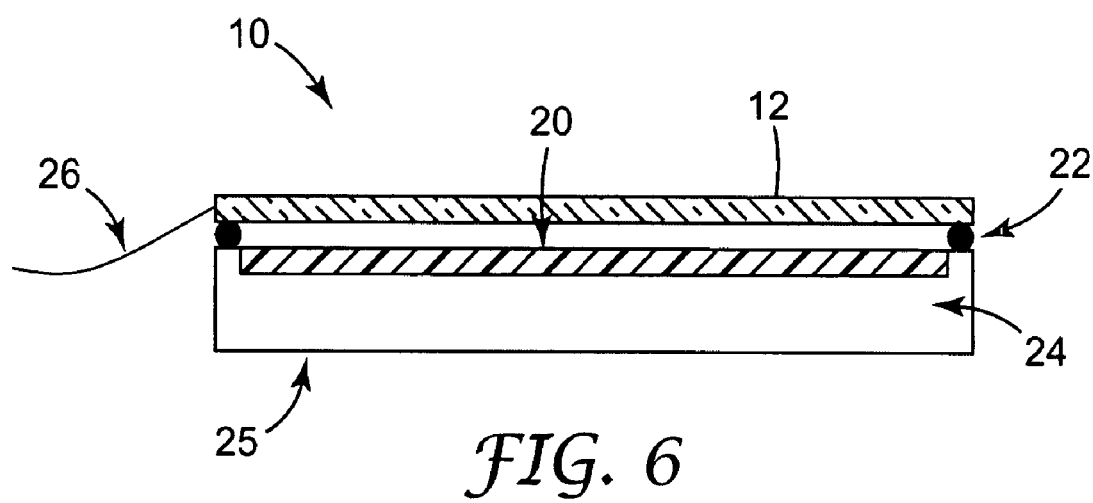
FIG. 6 is a sectional view of a touch sensitive device mounted to a display in accordance with an embodiment of the present invention.

FIG. 6 is a sectional view of a touch sensitive device 10 mounted to a display 25. The display 25 may be any suitable electronic display, such as a liquid crystal display (LCD), an electroluminescent display, a cathode ray tube display, a plasma display, a light emitting diode display, and the like. The display 25 may additionally or alternatively include static graphics that can be permanent or replaceable. The touch sensitive device 10 of the type illustrated in FIG. 6 includes a transparent substrate 12 mounted in front of an LCD screen 20.

The LCD screen 20 is mounted to a frame 24 of the LCD display 25. A foam gasket or mounting 22 is attached to the underside of the substrate 12 and extends substantially around the periphery of the substrate 12. The foam gasket 22 has adhesive surfaces whereby the substrate 12 may be securely attached to any surface. The foam gasket 22 may reduce the reflections from the edge of the substrate 12. A tail connector 26 of the touch sensitive device 10 may be connected to a controller of the touch sensitive device 10.

Figure 7:
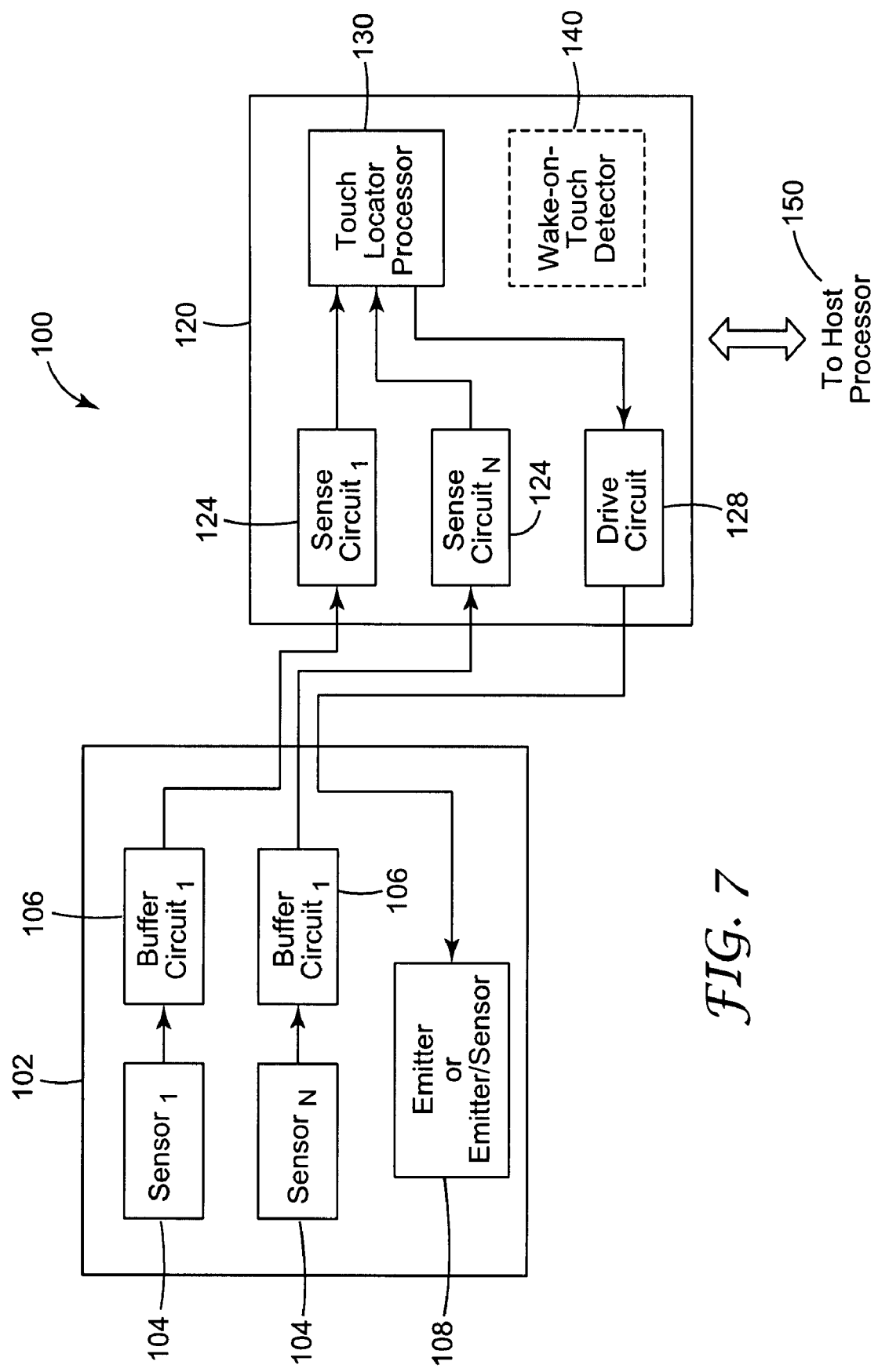
FIG. 7 is a depiction of a touch panel system that includes a touch sensitive device and a touch panel controller in accordance with an embodiment of the present invention.

FIG. 7 is a depiction of a touch panel system 100 that includes a touch sensitive device 102 and a touch panel controller 120. The touch sensitive device 102 includes at least three sensors 104, preferably four sensors 104, each coupled to an associated buffer circuit 106. The touch sensitive device 108 further includes at least one emitter transducer 108. The emitter transducer 108 may be configured to operate only as an excitation transducer or as a dual emitter/sensor transducer. Each of the buffer circuits 106 and emitter transducer 108 is coupled to the controller 120.

The controller 120 includes sense circuits 124 each coupled to one of the sensor/buffer circuit combinations 104/106. The sense circuits 124 typically include one or more of amplification, conditioning, and filtering circuitry. The emitter transducer 108 is coupled to a drive circuit 128 that generates signals that cause the emitter transducer 108 to generate predetermined excitation signals that are imparted to the substrate of the touch sensitive device 102. Each of the drive circuit 128 and sense circuits 124 is coupled to a touch location processor 130. The touch location processor 130 typically includes an analog signal conditioning stage, an analog-to-digital converter (ADC) sampling at an appropriate sampling frequency (e.g., 200 kHz), and a digital signal processor (DSP) that implements coordinate location algorithm/firmware and other algorithms and routines.

Figure 8:
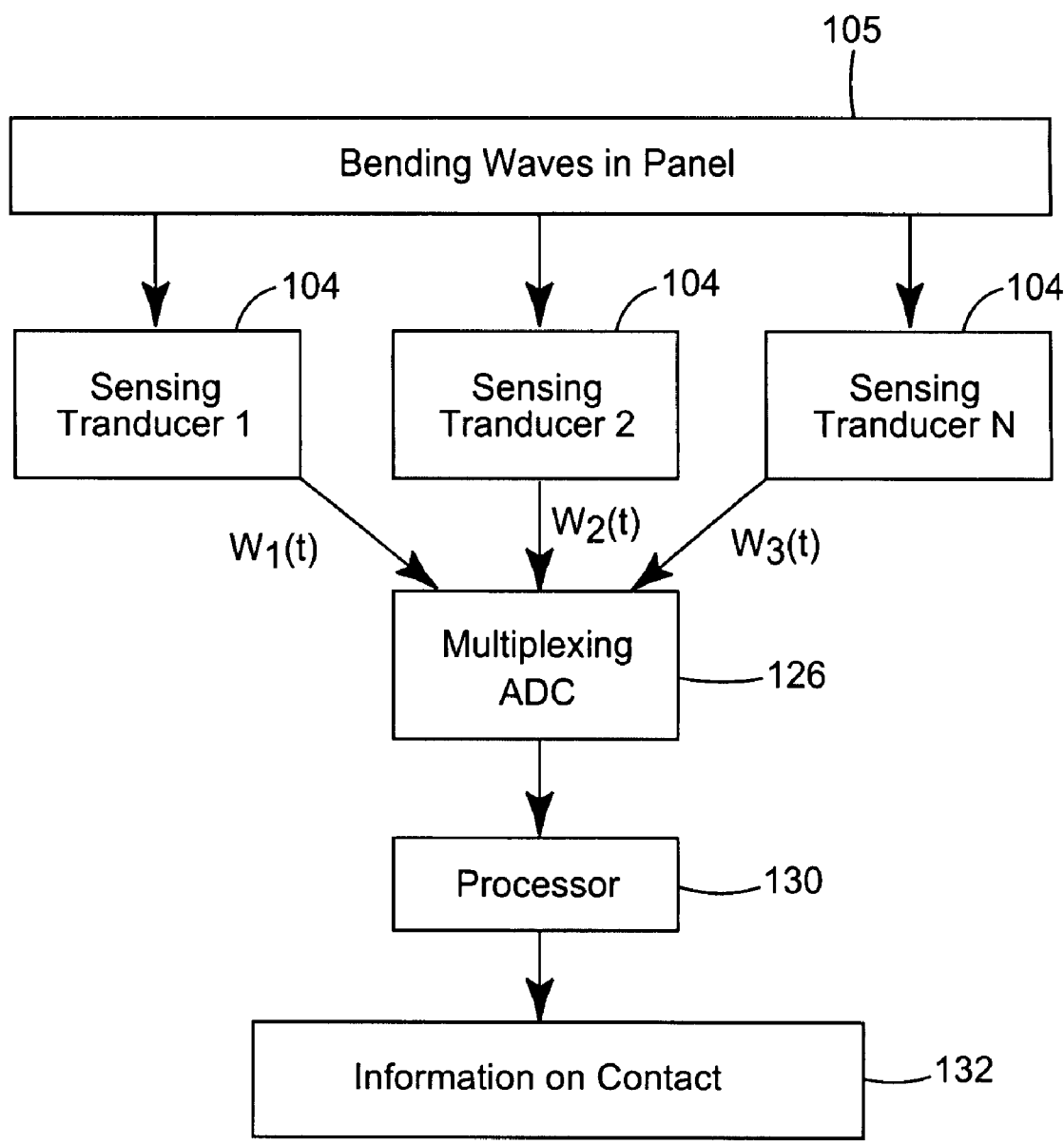
FIG. 8 illustrates an implementation for processing bending wave information obtained at each of a number of pickup sensors in accordance with an embodiment of the present invention.

For example, and with reference to FIG. 8, one implementation for processing of bending wave information sensed at each sensor 104 of FIG. 7 is illustrated. In FIG. 8, the bending waves in the panel 105 are sensed by at least three and preferably four sensors 104. The sensors 104 measure analog bending wave signals $W_1(t)$, $W_2(t)$ . . . $W_N(t)$, which are transmitted to a multiplexing ADC 126. The resultant digital input signal is transmitted to a touch location processor 130 from which information 132 relating to the location and profile of the contact impulse is determined.

Figure 9:
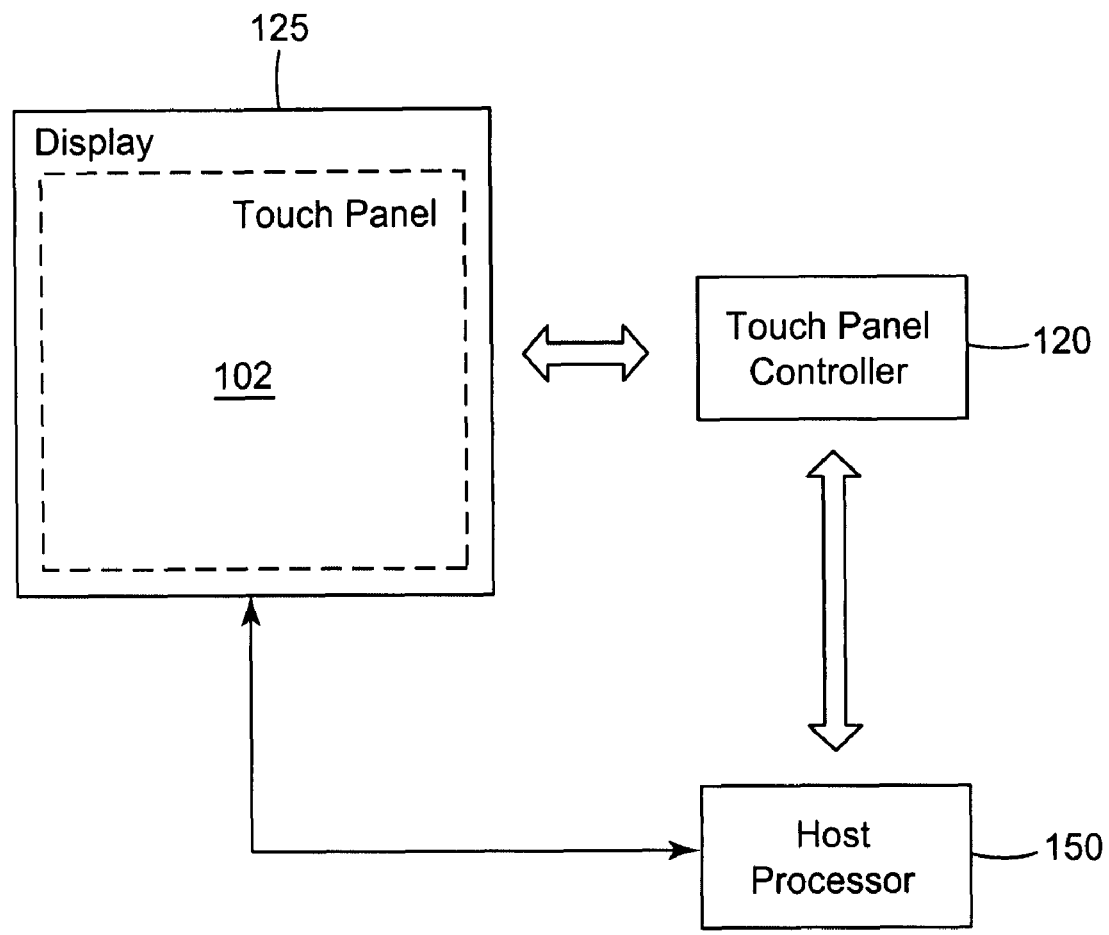
FIG. 9 illustrates a touch panel system that includes a touch sensitive device mounted to a display and coupled to a touch panel controller and host processor in accordance with an embodiment of the present invention.

As is further shown in FIG. 9, the touch panel controller 120 is typically coupled to a host processor 150. The host processor 150 is also coupled to a touch display system 125, which incorporates a touch sensitive device 102 of the type shown in FIG. 7. The host processor 150 may include a communications interface, such as a network interface, to facilitate communications between the touch panel system 100 and a remote system. Various touch panel system diagnostics, calibration, and maintenance routines, for example, may be implemented by cooperative communication between the touch panel system 100 and a remote system.

As is further shown in FIG. 7, the touch panel controller 120 may optionally include a wake-on-touch detector 140. In accordance with a general wake-on-touch approach, bending wave vibrations resulting from contact with, or otherwise imparted to, a substrate of a touch sensitive device are sensed. The sensed vibrations are analyzed or evaluated to determine if the sensed vibrations are the result of an intended touch by the user or an unintended touch to the touch sensitive device. In response to determining that the touch to the touch sensitive device was intentional, a wake-up signal is generated. If, however, it is determined that the touch to the touch sensitive device was unintentional, a wake-up signal is not generated.

The term "intended touch" refers to detectable vibrations, events causing such vibrations, and signals created due to sensors receiving such vibrations, that are intended to be interpreted as a touch input. The term "unintended touch" refers to detectable vibrations, events causing such vibrations, and signals created due to sensors receiving such vibrations, that are not intended to be interpreted as a touch input. Examples of an unintended touch include external noise as well as vibration-causing impacts to the touch sensitive device that do not produce a requisite signature in the detected signal.

The sensed vibrations are analyzed or evaluated to determine if the sensed vibrations are the result of an intended touch by the user or an unintended touch to the touch sensitive device. In general, the sensed bending wave vibrations are processed and compared to a threshold or profile that is established to facilitate discrimination between intended touches and unintended touches. Discriminating between intended touches and unintended touches can be accomplished in a number of ways, including touch signal amplitude comparisons with a threshold, filtered touch signal comparisons with a threshold, time domain evaluation (e.g., signal feature correlation analysis), and frequency domain evaluation (e.g., discrete Fourier Transform (DFT) analysis), for example. Details concerning various wake-on-touch approaches are disclosed in U.S. patent application Ser. No. 10/683,342, filed Oct. 10, 2003, which is incorporated herein by reference.

Figure 10:
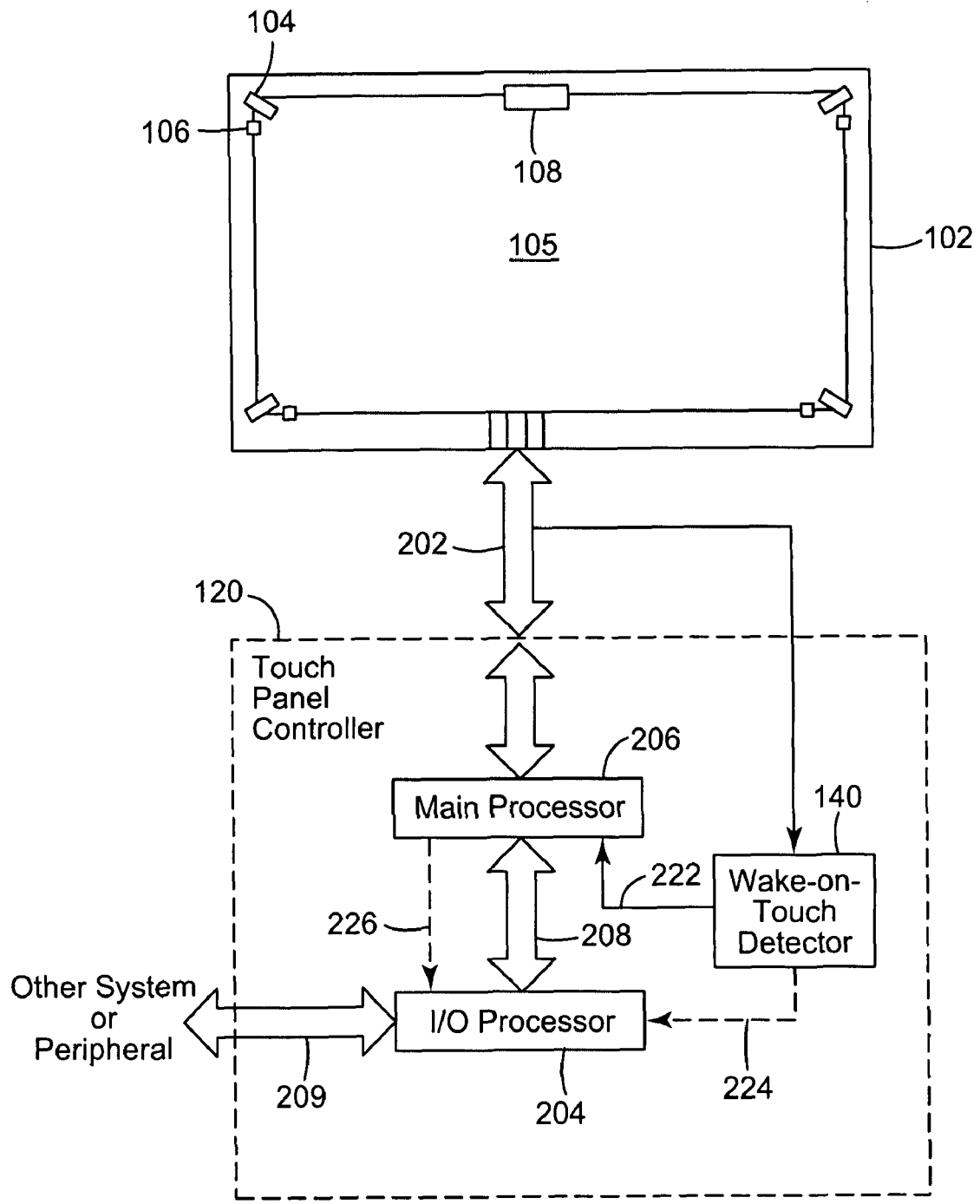
FIG. 10 shows an embodiment of a touch panel controller communicatively coupled to a touch sensitive device in accordance with the present invention.

FIG. 10 shows an embodiment of a touch panel controller 120 communicatively coupled to a touch sensitive device 102. According to this embodiment, touch panel controller 120 includes an I/O processor 204 coupled to main processor 206 via a bus 208. The I/O processor 204 is employed in this embodiment to manage I/O signaling between the touch panel controller 120 and an external system or device via bus 209.

In one configuration, I/O processor 204 is implemented to manage signaling over a high-speed interface 209, such as a serial interface or bus. By way of example, bus 209 may conform to a high-speed serial bus architecture, such as a USB (Universal Serial Bus) or IEEE 1394 Fire Wire architecture, and I/O processor 204 can be implemented to coordinate signaling over serial bus 209. Configuring bus 209 in accordance with a USB or Fire Wire specification offers instant plug and play connectivity. As such, touch panel controller 120 can be plugged into, and unplugged from, different ports at any time with no adverse consequence regarding connectivity.

As is shown in FIG. 10, wake-on-touch detector 140 is coupled to the I/O processor 204, interface 202, and optionally to main processor 206. In another configuration, wake-on-touch detector 140 can be coupled to the front end of the I/O processor 204 or be incorporated as an interface between I/O processor 204 and bus 202. The wake-on-touch detector 140 is preferably configured to receive sense signals from the touch sensitive device 102 yet not adversely affect transmission of sense signals and other signals or data between the touch sensitive device 102 and touch panel controller 120.

According to one configuration depicted in FIG. 10, wake-on-touch detector 140 can be coupled to the I/O processor 204, such that a wake-up signal generated by wake-on-touch detector 140 is transmitted to I/O processor 204 via line 222. In this configuration, the I/O processor transitions from a sleep mode to an active mode in response to the wake-up signal. After transitioning from sleep to active mode, the I/O processor 204 may determine whether other components require activation, such as the main processor 206 or other components of the touch panel controller 120 and/or control system of the portable device incorporating the touch sensitive device 102. Alternatively, the I/O processor 204 may generate a secondary wake-up signal that is transmitted via line 226 to the main processor 206 via bus 208. In another configuration, wake-on-touch detector 140 can generate a wake-up signal and transmit the wake-up signal to both I/O processor 204 (via line 222) and main processor 206 (via line 224).

In the configuration of the touch sensitive device 102 shown in FIG. 10, each of the sensors 104 is coupled to a buffer circuit 106. Because the buffer circuits 106 have active components (e.g., JFET), power must be supplied to the buffer circuits 106 when active. As such, the sensors 104 are poor candidates for wake-on-touch sensors in applications where power conservation is an issue. The emitter transducer 108, however, is not coupled to a buffer circuit 106, making the emitter transducer 108 a good candidate for a wake-on-touch sensor.

It is readily appreciated that a wake-on-touch methodology according to this embodiment can significantly reduce power consumption of touch sensitive devices, particularly portable and hand-held touch input devices. For example, each of main processor 206 and I/O processor 204 can require several hundred milliamps of current during normal operation. With the use of wake-on-touch detection using the emitter transducer 108, most of the circuitry of main processor 206 and I/O processor 204 can be turned off in sleep mode, thereby appreciably reducing power requirements to a small fraction of that required for full operations.

Provision of a dedicated excitation transducer operating in cooperation with pick-up sensors on a touch panel allows for implementation of a wide variety of new and useful touch detection system operating and diagnostic capabilities. Such capabilities include, for example, enhanced lift-off detection, improved sensitivity to light touches, and improved wake-on-touch functionality. These and other enhanced capabilities may be implemented using certain stimuli generated by the excitation transducer and processing of signals produced by pickup sensors in response to such stimuli.

As described above, touch sensing devices employing bending wave technology sense vibrations propagating in the plane of the touch panel to determine the location of the touch input. In some applications, additional information beyond touch location may be desirable to more fully characterize the touch. For example, processes may be implemented to provide more accurate information regarding the timing of touch initiation, denoted herein as touch down. Furthermore, detection of the end of the touch event, denoted herein as touch lift off, may also be helpful in characterizing the touch event.

Various embodiments of the invention are directed to methods and systems for touch sensing with enhanced touch down and/or lift off detection. In various implementations, enhanced sensitivity to touch down and/or lift off involves the use of an emitting transducer. The emitting transducer induces bending waves used to characterize an untouched condition of the touch panel. Sensing transducers generate a signal responsive to the induced bending waves that is identified as an untouched condition signal.

Touch down may be detected by comparing the untouched condition signal and a signal generated in response to a touch on the touch panel. If a touch occurs on the touch panel, the touch produces bending waves in the touch panel. The bending waves produced by the touch combine with the bending waves induced by the emitting transducer. Sensing transducers sense the combined bending waves and generate a bending wave signal. Touch down may be detected by comparing the bending wave signal with the untouched condition signal. In one implementation, if the bending wave signals deviate from the untouched condition signal by a threshold amount, a touch down event is detected. Upon detection of touch down, a touch location determination algorithm may be triggered.

Lift off occurs when the touch is removed, causing the touch panel to return to the untouched condition. Lift off may be detected when the bending wave signal returns to the untouched condition signal.

The sensitivity of the system in detecting touch down and/or lift off may be limited by the touch down/lift off triggering scheme. For example, in a passive system that does not include an emitting transducer, touch down may be detected if the bending waves responsive to a touch on the touch panel generate bending wave signals above a threshold level. Following touch down detection, lift off may be detected if the bending wave signals fall below the threshold level. The threshold level may be defined in relation to a background noise baseline and may vary dynamically with noise.

Touch down detection based on a correlation-based sensing methodology may be more tolerant to noise than the passive threshold crossing method described above. The touch down detection methods described herein may employ an emitting transducer in combination with a correlation-based sensing process to increase touch down and lift off sensitivity to light touches when compared to passive threshold crossing techniques.

FIGS. 11a-15c are flowcharts illustrating various methods of detecting touch down and/or touch lift off in accordance with embodiments of the invention. The methods described in connection with FIGS. 11a-15c involve the use of at least one emitting transducer and two or more sensing transducers. In a preferred configuration, four sensing transducers are positioned near respective corners of a rectangular touch panel. An emitting transducer may be positioned along an edge of the touch panel, or in another location. The emitting transducer and/or the sensing transducers may include piezoelectric, electrostrictive, magnetostrictive, piezoresistive, acoustic, and/or moving coil transducers/devices. The sensing transducers may be coupled to FET buffer circuits as described above.

Figure 11A:
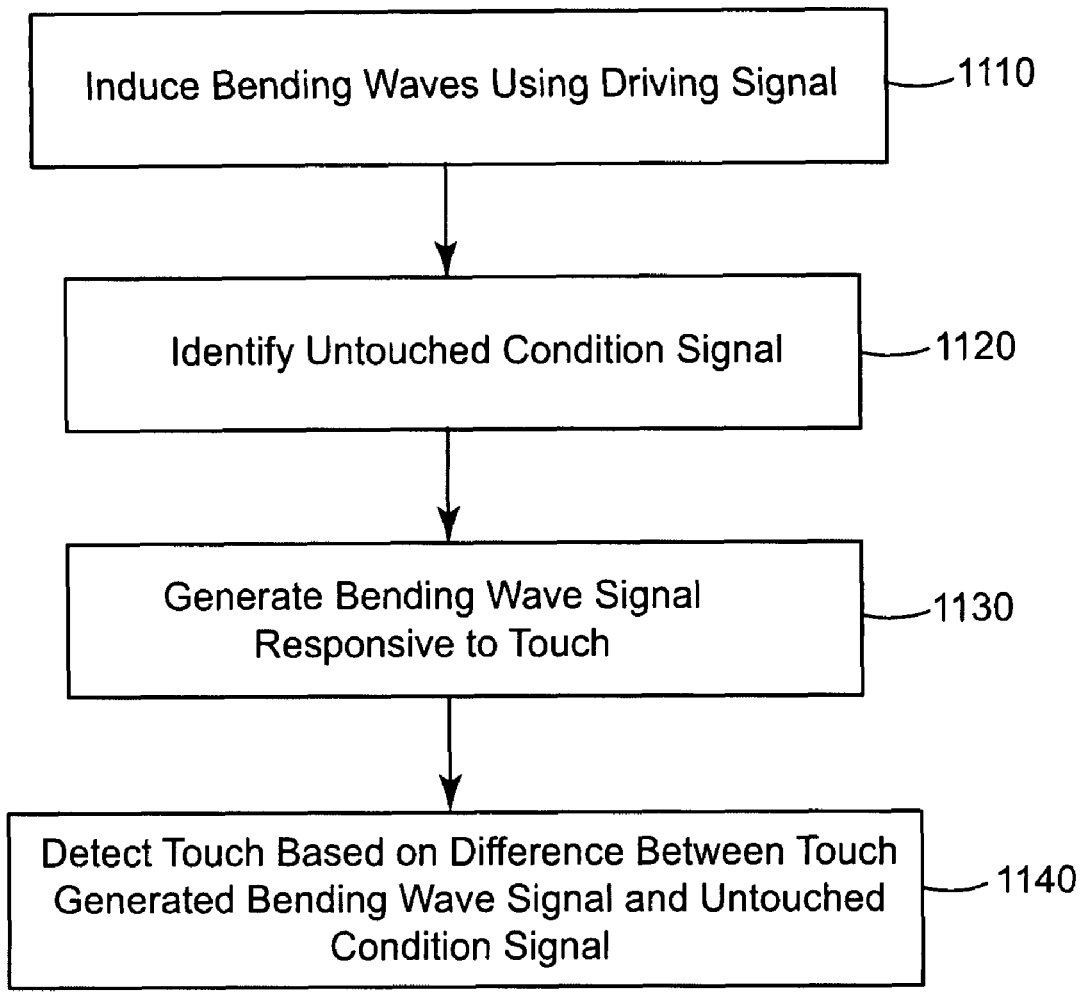
FIG. 11a is a flowchart illustrating a method of touch down detection in accordance with embodiments of the invention.

The flowchart of FIG. 11a illustrates a method of touch down detection in accordance with embodiments of the invention. A driving signal energizes the emitting transducer causing the emitting transducer to induce 1110 bending waves in the touch panel. The transducer-induced bending waves propagate dispersively in the touch panel to the sensing transducers. When no touch is applied to the touch panel, only the bending waves induced by the emitting transducer are present in the touch panel. In this condition, the sensing transducers generate signals corresponding to an untouched condition. The signal corresponding to the untouched condition is identified 1120.

If a touch is applied to the touch panel, bending waves are produced in the touch panel and are sensed by the sensing transducers. A bending wave signal responsive to the touch is generated 1130. The bending wave signal responsive to the touch is compared to the untouched condition signal. Touch down is detected 1140 based on a difference between the touch-generated bending wave signal and the untouched condition signal. Touch down detection may trigger a touch location algorithm for touch location determination.

Figure 11B:
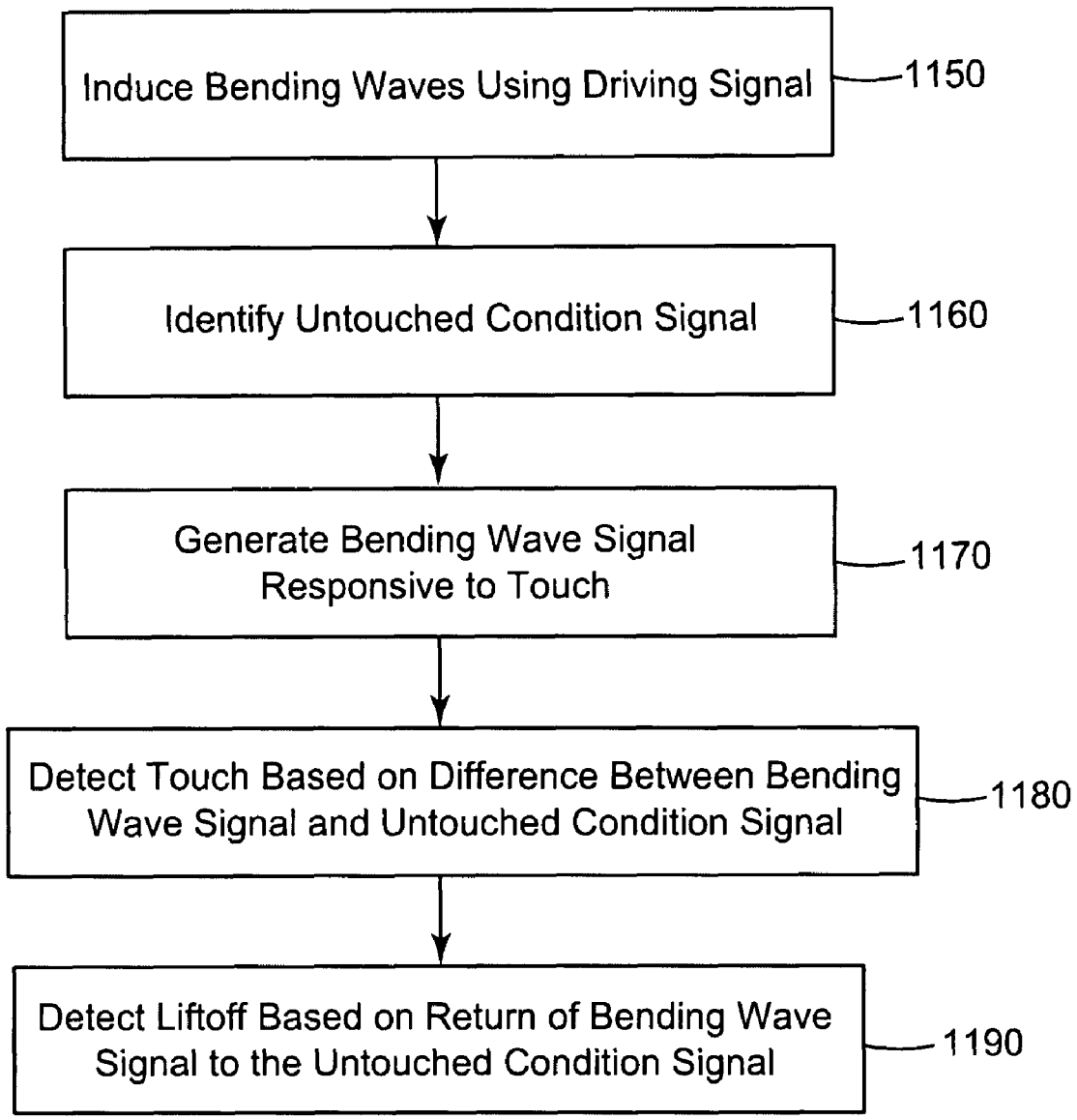
FIG. 11b is a flowchart illustrating a method of lift off detection in accordance with embodiments of the invention.

The flowchart of FIG. 11b illustrates a method of lift off detection in accordance with embodiments of the invention. The lift off detection process illustrated in FIG. 11b employs the touch down method previously described in connection with FIG. 11a. A driving signal energizes the emitting transducer causing the emitting transducer to induce 1150 bending waves in the touch panel. When no touch is applied to the touch panel, only the bending waves induced by the emitting transducer are present in the touch panel. In this condition, the sensing transducers generate signals corresponding to an untouched condition. The signal corresponding to the untouched condition is identified 1160.

If a touch is applied to the touch panel, bending waves are produced in the touch panel and are sensed by the sensing transducers. A bending wave signal responsive to the touch is generated 1170. Touch down is detected 1180 based on a difference between the touch generated bending wave signal and the untouched condition signal. Touch down detection may trigger a touch location algorithm for touch location determination.

After the touch is detected, the bending wave signal continues to be compared to the untouched condition signal. Lift off is detected 1190 based on a return of the bending wave signal to the untouched condition signal.

Figure 12A:
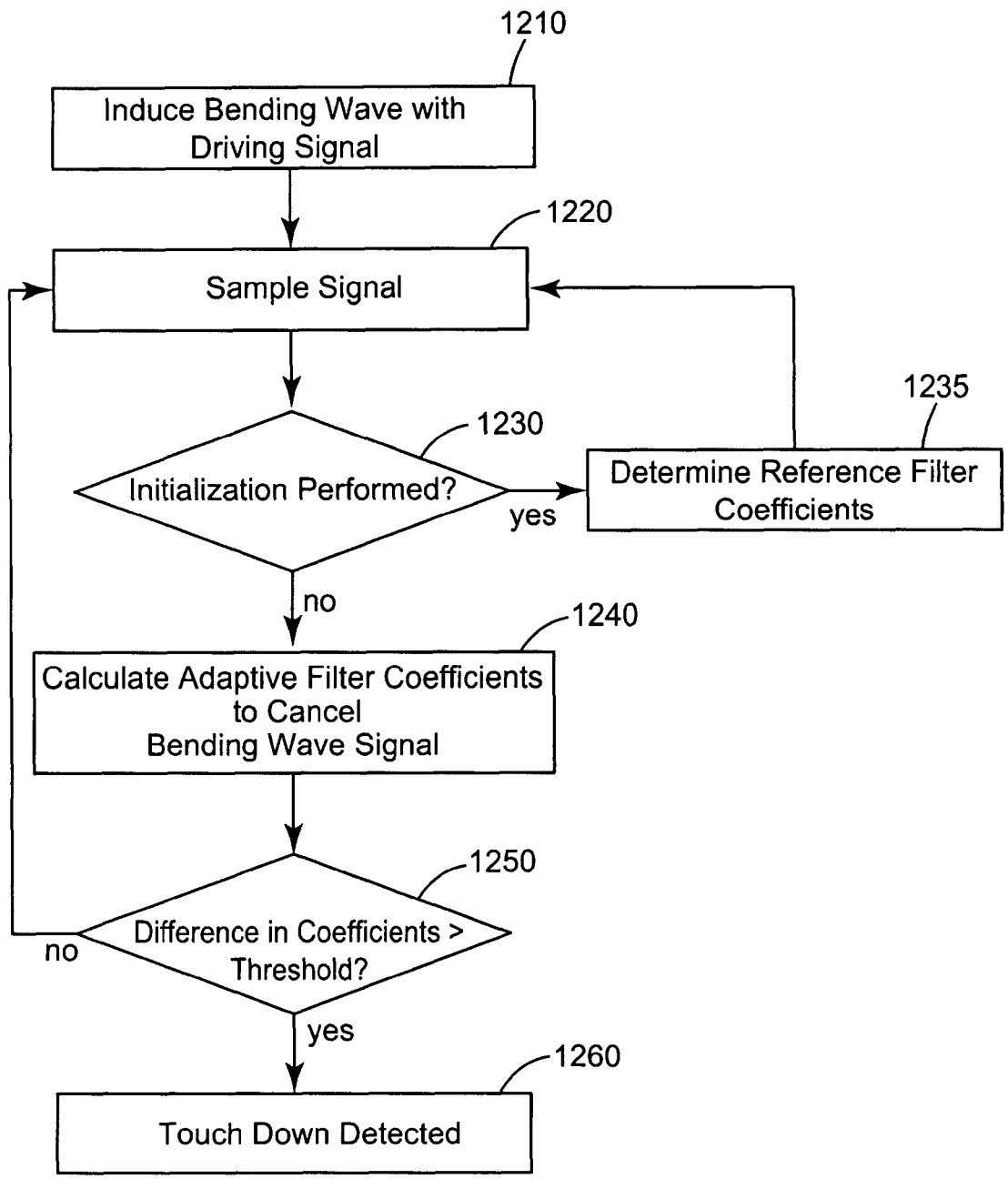
FIG. 12a is a flowchart illustrating a method of touch down detection based on an adaptive filter approach in accordance with embodiments of the invention.

FIG. 12a illustrates a flowchart of a method of touch down detection based on an adaptive filter approach in accordance with embodiments of the invention. In this implementation, the emitting transducer may induce bending waves in the touch panel using a driving signal 1210 operating at a single fundamental frequency, e.g., 50 kHz or other frequency value. The driving signal may be generated digitally and phase locked to the frequency of an analog-to digital converter used for processing the sensed signals.

A bending wave signal generated by the sensing transducers is sampled 1220 and applied to the input of an adaptive filter. The adaptive filter has the ability to update its coefficients. The adaptive filter may be digitally implemented, for example, using a two tap least mean square (LMS) adaptive filter algorithm. The two tap adaptive filter algorithm provides sufficient information regarding the amplitude and phase of the sensed bending wave signal for touch down and/or lift off detection.

Before applying the sensed signal to the adaptive filter, the signal may first be filtered by a band pass filter corresponding to the fundamental frequency, e.g., 50 kHz, and averaged. If the system has not yet been initialized 1230, then the reference coefficients of the adaptive filter are determined 1235. The process of determining reference coefficients involves determining filter coefficients that cancel the signal generated by bending waves induced by the emitting transducer. In other words, the reference filter coefficients represent the filter coefficients that cancel the untouched condition signal. In this scenario, the output of the adaptive filter is minimal when only the untouched condition signal is applied to the input of the filter.

If the system has previously been initialized 1220, then filter coefficients are calculated 1240 to cancel the bending wave signal. The calculated filter coefficients are compared to the reference coefficients. If touch down is not detected, then the filter coefficients that cancel the bending wave signal are substantially the same as the reference coefficients. If the change in the filter coefficients does not exceed 1250 a threshold, then no touch is detected and the process described in blocks 1210-1240 continues.

If a touch is present on the touch panel, the bending wave signal generated by the sensing transducers is changed from the untouched condition signal. The filter coefficients calculated to cancel the bending wave signal generated by the touch are different from the reference coefficients. If the change in the filter coefficients exceeds 1250 a threshold, then touch down is detected 1260.

After touch down is detected, lift off may be determined by detecting a return of the bending wave signal to the untouched condition signal. The lift off detection process illustrated in FIGS. 12b-12c employs the adaptive filter approach to touch down detection previously described in connection with FIG. 12a.

Figure 12B:
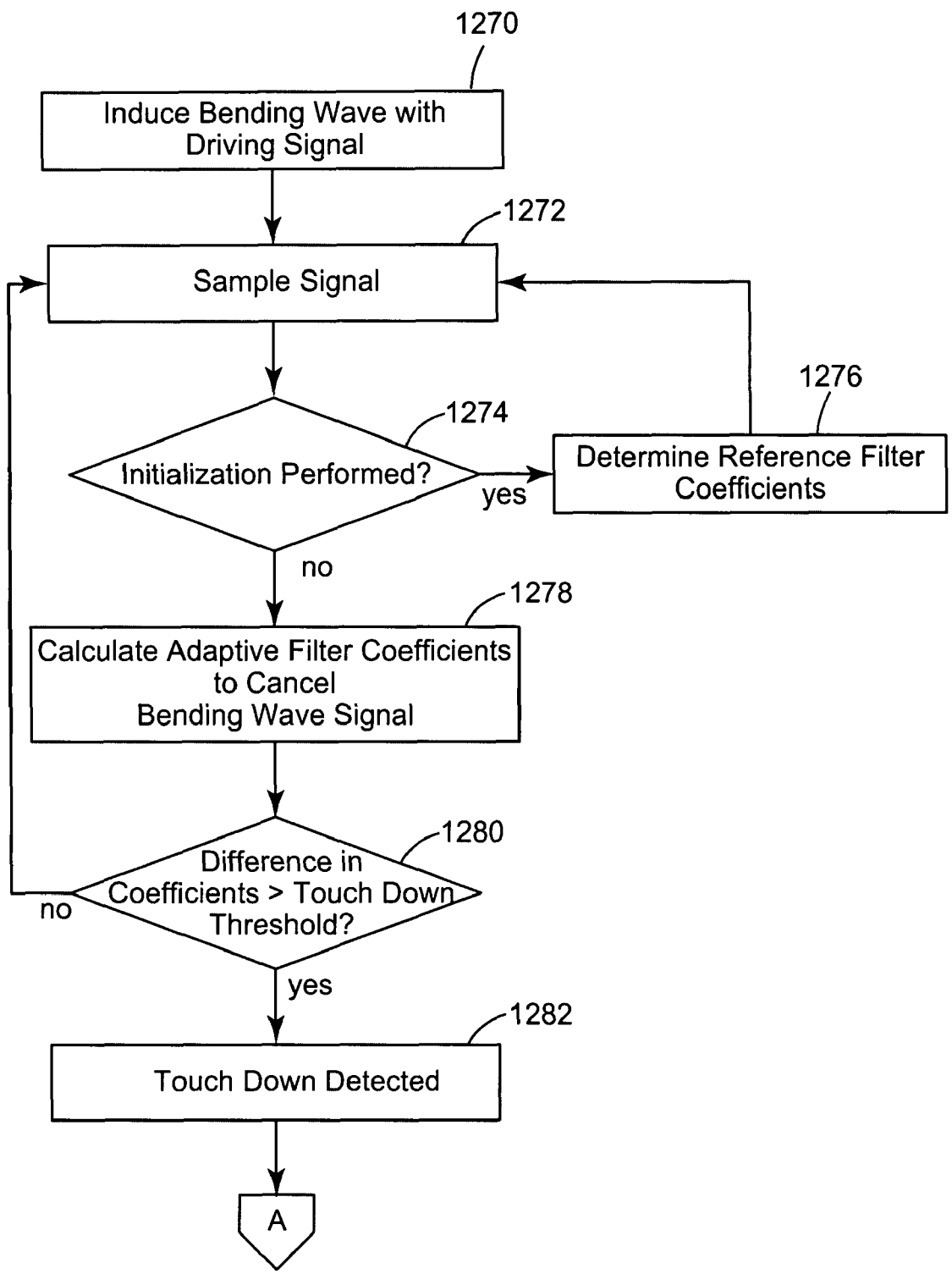
FIGS. 12b-12c are flowcharts illustrating a method of lift off detection employing an adaptive filter approach in accordance with embodiments of the invention.
Figure 12C:
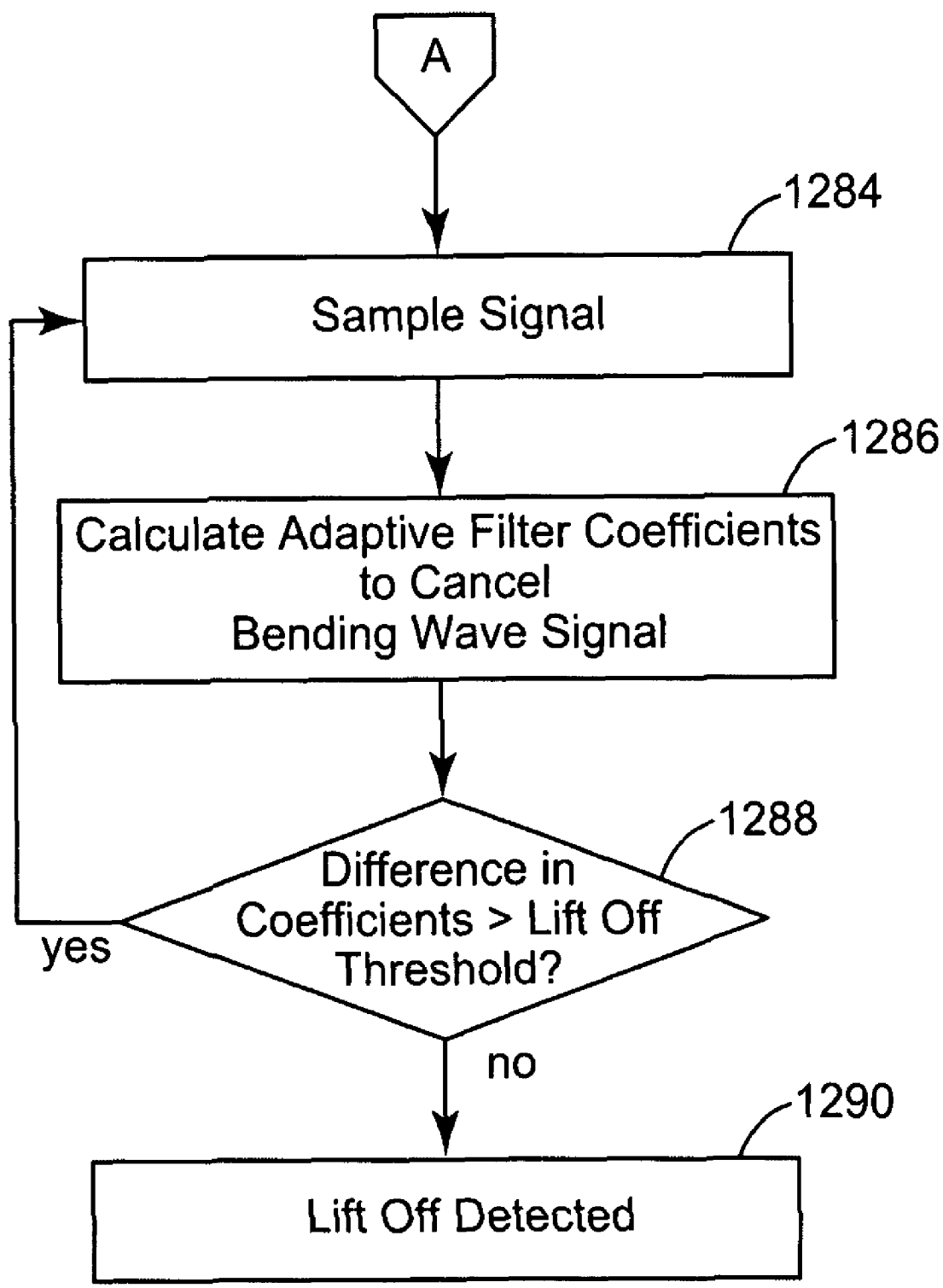

FIGS. 12b-12c illustrate a flowchart of a method of lift off detection in accordance with embodiments of the invention. An emitting transducer induces bending waves in the touch panel using a driving signal 1270 operating at a single fundamental frequency, e.g., 50 kHz or other frequency value. A bending wave signal generated by the sensing transducers is sampled 1272 and applied to the input of an adaptive filter.

If the system has not yet been initialized 1274, then the reference coefficients of the adaptive filter are determined 1276. The process of determining reference coefficients involves determining filter coefficients that cancel the signal generated by bending waves induced by the emitting transducer. In other words, the reference filter coefficients represent the filter coefficients that cancel the untouched condition signal. In this scenario, the output of the adaptive filter is minimal when only the untouched condition signal is applied to the input of the filter.

If the system has previously been initialized 1274, then filter coefficients are calculated 1278 to cancel the bending wave signal. The calculated filter coefficients are compared to the reference coefficients. If touch down is not detected, then the filter coefficients that cancel the bending wave signal are substantially the same as the reference coefficients. If the difference between the calculated filter coefficients and the reference filter coefficients does not exceed 1280 a touch down threshold, then no touch is detected and the process described in blocks 1270-1278 continues.

If a touch is present on the touch panel, the bending wave signal generated by the sensing transducers is changed from the untouched condition signal. The filter coefficients calculated to cancel the bending wave signal generated by the touch are different from the reference coefficients. If the difference between the calculated filter coefficients and the reference filter coefficients exceeds 1280 a touch down threshold, then touch down is detected 1282. Touch down detection may trigger the touch location process.

After touch down is detected, the bending wave signal continues to be sampled 1284 to determine lift off. The filter coefficients are calculated 1286 to cancel the bending wave signal. The calculated filter coefficients are compared to the reference coefficients. If the difference between the calculated filter coefficients and the reference filter coefficients exceeds 1288 a lift off threshold, then lift off is not detected the lift off detection process continues as described in blocks 1284-1288 continues. If the difference between the calculated filter coefficients and the reference filter coefficients does not exceed 1288 the lift off threshold, then lift off is detected 1290.

The methods discussed in connection with FIGS. 11a-11b and 12a-12c above involve identifying a reference associated with an untouched condition signal. For example, in the methods described in connection with FIGS. 12a-12c, the reference comprises reference coefficients of the adaptive filter that operate to cancel the untouched condition signal. The touch sensing system may change gradually over time due to component drift, ageing of the physical support structure of the touch panel, gradual accumulation of dust and/or other contaminants on the touch panel surface, and/or other factors. These gradual changes may cause the untouched condition signal to change slowly over time. Eventually, the reference coefficients may no longer cancel the untouched condition signal. Furthermore, the touch system may undergo abrupt changes that cause a sudden deviation in the untouched condition signal. For example, a spill or other deposit of a contaminant on the touch surface may abruptly change the untouched condition signal. Slow or sudden changes in the untouched condition signal may lead to errors in touch down and/or lift off detection.

Figure 13:
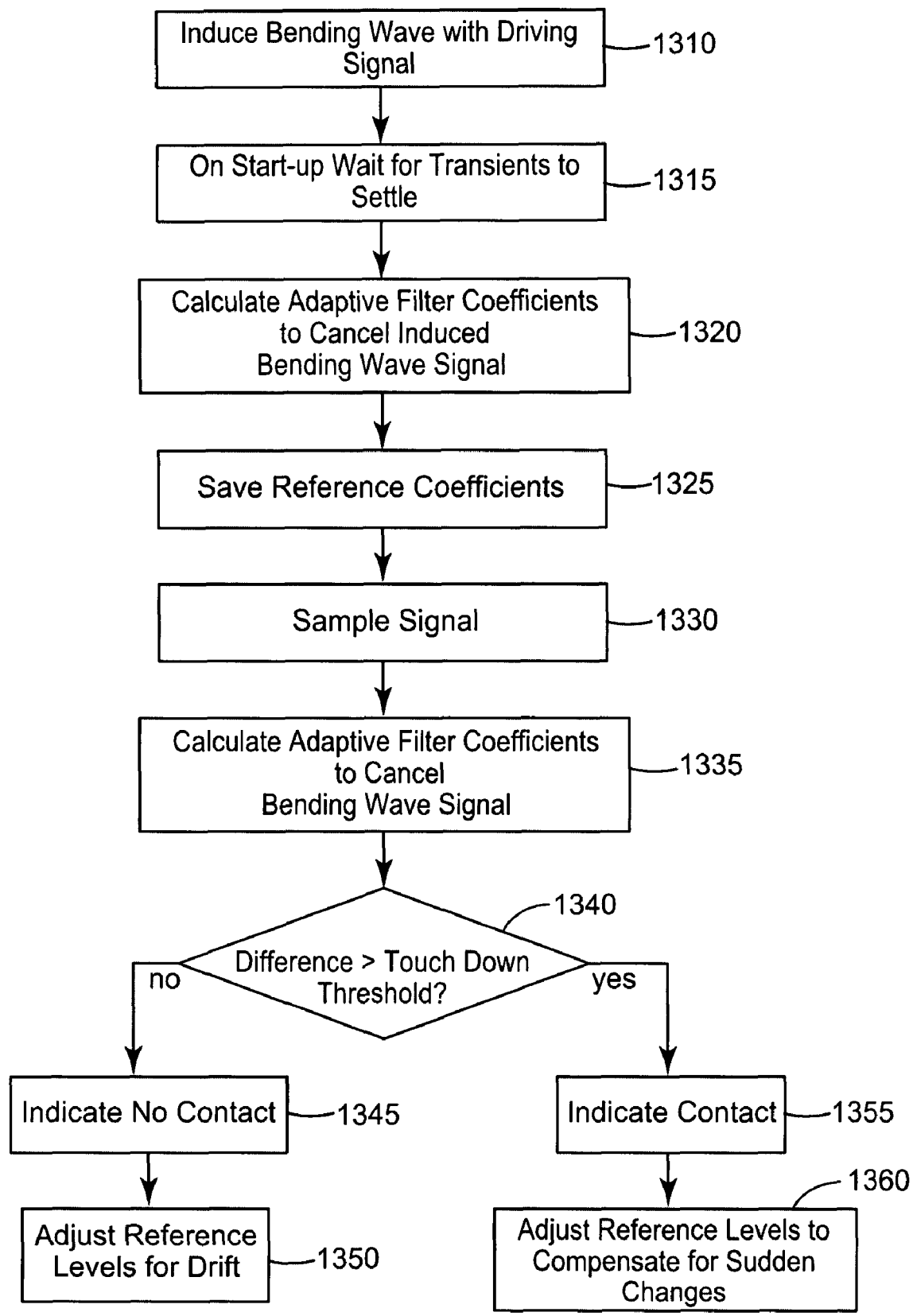
FIG. 13 is a flowchart illustrating a method of adapting the reference coefficients used for touch down and/or lift off detection processes in accordance with embodiments of the invention.

FIG. 13 is a flowchart illustrating a method for updating the reference used in touch down and/or lift off detection processes in accordance with embodiments of the invention. In this embodiment, reference coefficients of an adaptive filter are updated, although, the process is equally applicable when other references are used. The reference adjustment may be performed to compensate for slow drift and/or abrupt changes to the touch system.

As previously described, the emitting transducer induces bending waves in the touch panel using a driving signal 1310. The driving signal may be operated at a single fundamental frequency, e.g., 50 kHz or other frequency value. Sensing transducers sense the bending waves produced by the driving signal and generate a signal representative of the sensed bending waves.

On start-up, the system may implement an initialization process, described in connection with blocks 1315-1325 of FIG. 13. After transients have settled 1315, the adaptive filter coefficients required to substantially cancel the transducer-induced bending wave signal are determined 1320. These initialized filter coefficients represent the reference coefficients associated with the untouched condition signal. The reference coefficients are stored 1325.

A bending wave signal generated by the sensing transducers is sampled 1330 and applied to the input of the adaptive filter. The filter coefficients required to cancel the applied input signal are calculated. The calculated filter coefficients are compared to the reference coefficients. If the difference between the calculated filter coefficients and the reference filter coefficients exceeds 1340 a touch down threshold, then a touch down 1355 is indicated.

In some situations, the touch system may undergo an abrupt change after initialization and determination of the reference coefficients. The sudden change may be caused, for example, by events such as a substance spilled or otherwise suddenly applied on the touch panel, or an impact that abruptly alters the relationship of structural components of the touch system. The sudden change may abruptly alter the bending waves induced by the driving signal, causing an associated change in the untouched condition signal. The sudden change may initially be detected as a touch contact.

In accordance with embodiments of the invention, the system may discriminate between a signal associated with touch contact and a signal caused by other factors. The system may compensate for an abrupt change that is unrelated to a touch by adjusting the reference coefficients over time. Such a process eliminates the non-touch related effects due to factors such as those mentioned above. Update of the reference coefficients may be periodically performed on a timescale selected to be long compared to the longest duration of a touch. Readjustment of the reference may be performed abruptly or gradually over time.

Valid touch conditions are, in general, relatively brief events, producing a transient deviation from the reference condition. If a significant deviation from the reference condition persists over a longer period time, it is unlikely that the deviation is produced by a touch. In this situation, the system may adjust 1360 the reference coefficients to compensate for the deviation. After a period of time, the system becomes "recalibrated" taking into account the abrupt change.

If the change in the filter coefficients is not greater than 1340 a threshold, then no contact 1345 is indicated. The reference coefficients may be adjusted 1350 to compensate for system drift. In this scenario, the calculated coefficients may be slightly changed due to system drift, but the change does not exceed the touch detection threshold. Adjusting the reference coefficients allows the system to compensate for factors such as drift of electronic component parameters, ageing of the physical support structure of the touch panel, gradual accumulation of dust or other contaminants on the touch panel surface, and/or other factors. The reference coefficients are adjusted based on the most recent transducer-induced bending wave signal. The reference coefficient adjustment may be implemented, for example, by performing a weighted average of recent reference coefficients.

Touch down and/or lift off detection using a driving signal operating at a single fundamental frequency as described above is robust to signal noise. Tracking changes in the bending wave signal itself, rather than the filter coefficient values, may be faster, but more susceptible to noise. Furthermore, using a driving signal operating at a single fundamental frequency is computationally efficient. However, problems may arise if the frequency of the driving signal corresponds to a fixed pattern of vibration in the touch panel. In this situation, the touch panel may exhibit areas of higher or lower movement corresponding to nodes and anti-nodes in a modal system with low damping. If a small area of contact is used, such as a pen or a fingernail, a particular area may be more or less sensitive to the contact due to the spatial variation of the plate. This effect is reduced if the contact area is significant when compared to the wavelength of the plate at the fundamental frequency selected for the driving signal.

An approach to offset the spatial sensitivity variation that may be produced using a single frequency driving signal is to use a multiple frequency signal. The signal sensed at each sensor may be processed for each of the multiple frequencies in the driving signal. Alternatively, the signals generated by different sensing transducers may be used to process a smaller subset of the driving frequencies.

When selecting a multiple frequency driving signal, spatial periodicity of the touch panel should be avoided. For a square root dispersion relation, the wavelength is proportional to the inverse of the square root of frequency. In order to avoid overlapping nodal lines, the following condition should be avoided:

$$n \cdot \sqrt{\omega_1} = m \cdot \sqrt{\omega_2} \quad [1]$$
$$\Rightarrow \frac{\sqrt{\omega_1}}{\sqrt{\omega_2}} = \frac{m}{n}.$$

where $\omega_1$ and $\omega_2$ are frequencies of a multiple frequency driving signal, and n and m are arbitrary integers. There are many ratios of frequencies that give rise to this condition being met. This simplest frequency ratio that meets this condition is a factor of two between the two frequencies, $\omega_1$ and $\omega_2$.

Figure 14A:
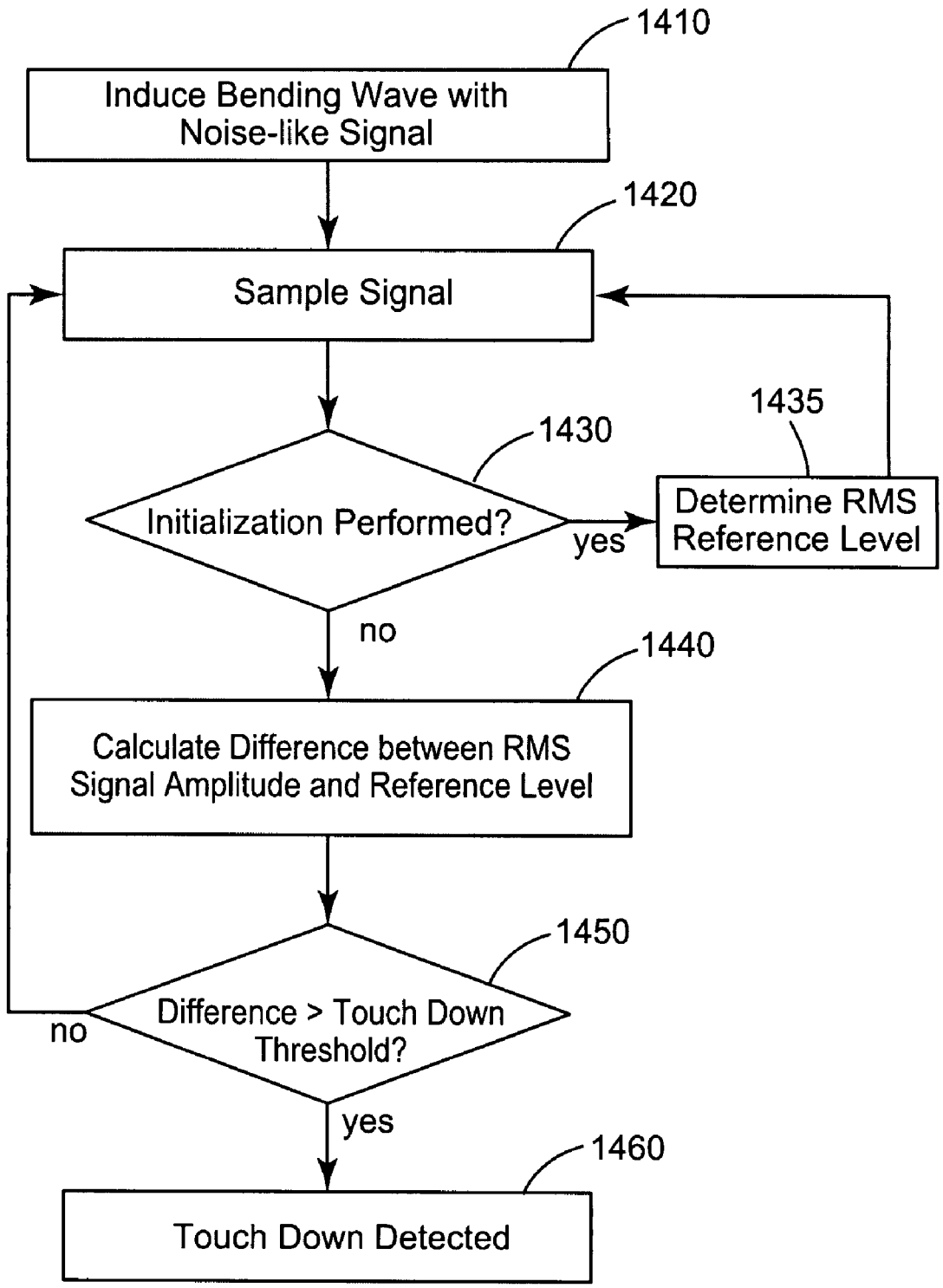
FIG. 14a is a flowchart illustrating a method of touch down detection using a broadband noise stimulus as a driving signal in accordance with embodiments of the invention.
Figure 14B:
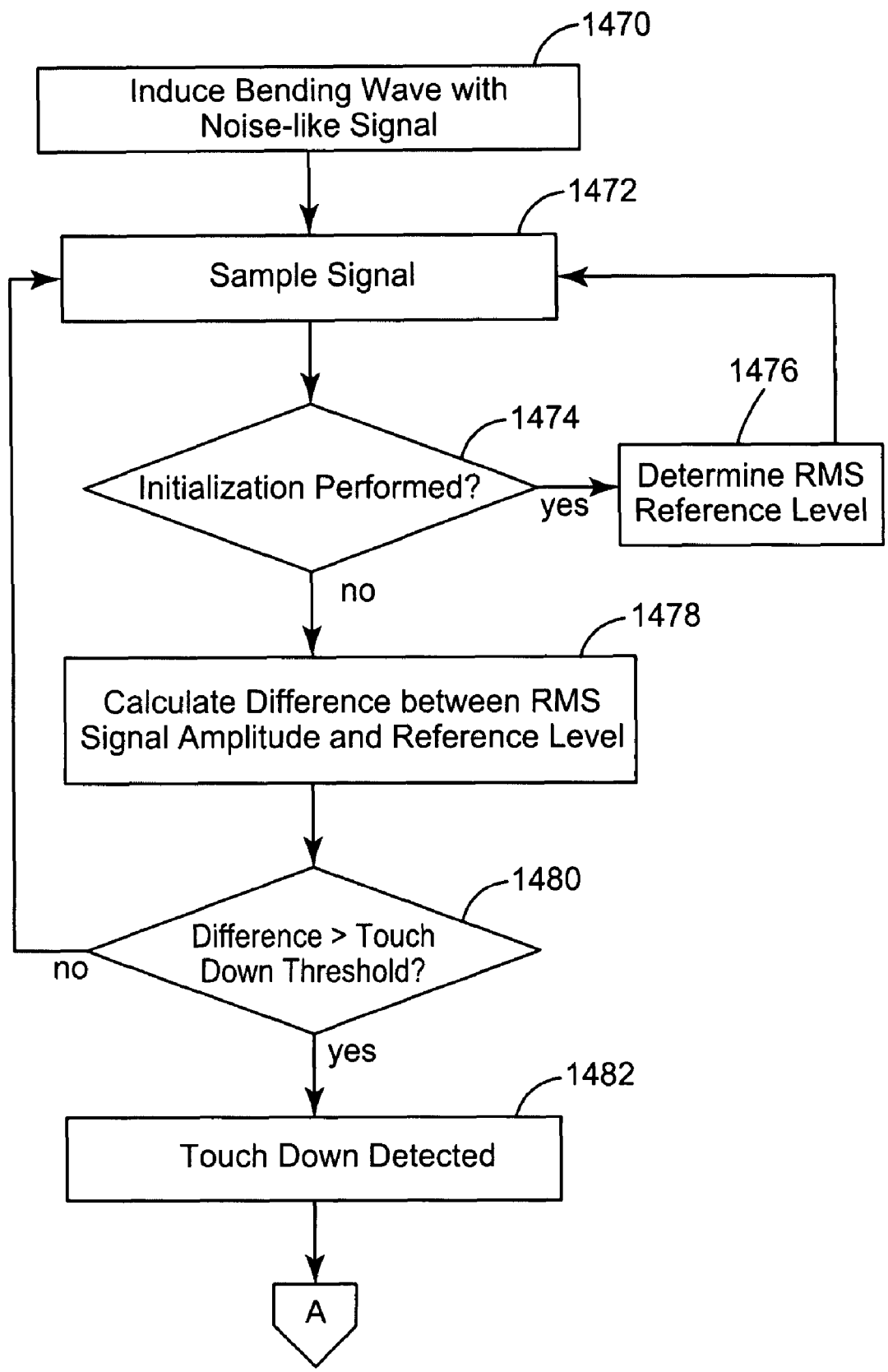
FIGS. 14b-14c are flowcharts illustrating a method of lift off detection using a broadband noise stimulus as a driving signal in accordance with embodiments of the invention.
Figure 14C:
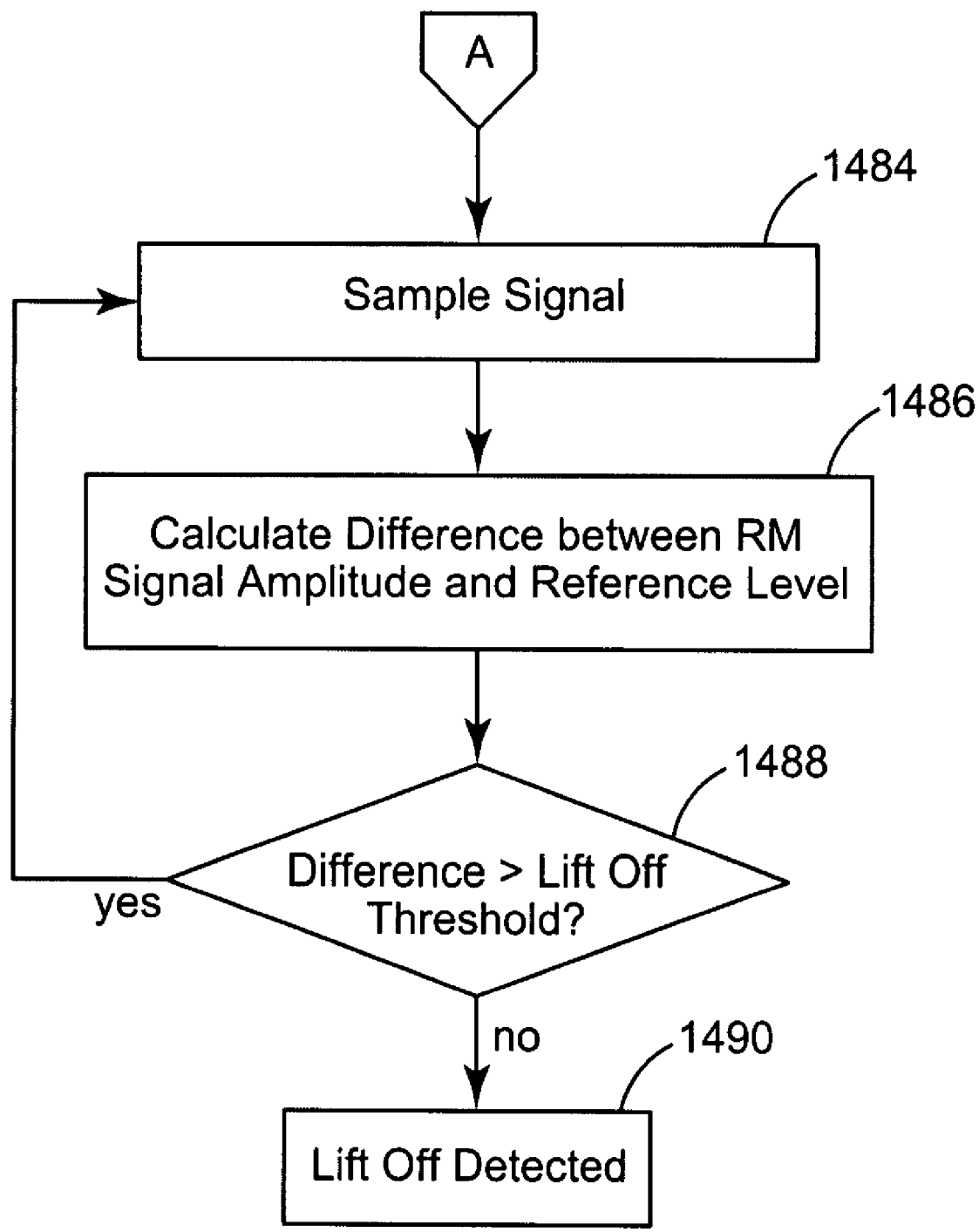

Touch down and/or lift off detection may be implemented using a multiple frequency signal to drive the emitting transducer. FIG. 14*a* illustrates a flowchart of a method of touch down detection using a broadband noise stimulus as a driving signal in accordance with embodiments of the invention. FIGS. 14*b*-14*c* illustrate a corresponding flowchart of a method of lift off detection in accordance with embodiments of the invention.

In the embodiments illustrated in FIGS. 14*a* and 14*b*-14*c*, a broadband noise signal is used to energize the emitting transducer. The emitting transducer induces 1410, 1470 bending waves in the touch panel responsive to the broadband noise signal.

Bending waves in the touch panel propagate dispersively in the touch panel and are sensed by the sensing transducers. The sensed signals are sampled 1420, 1472 and may be further processed, e.g., amplified, filtered and/or digitized to facilitate analysis of the signals. In one example, the bending wave signal may be filtered using a filter with a pass band of about 50 kHz to about 75 kHz.

If the system has not yet been initialized 1430, 1474, then an amplitude reference level of the untouched condition signal is determined 1435, 1476. The process may involve, for example, calculating an RMS value of the bending wave signal responsive to transducer-induced bending waves.

If the system has previously been initialized 1420, 1472, then the RMS value of the sensed bending wave signal is determined. The RMS value of the bending wave signal is compared 1440, 1478 the previously determined reference value. If the difference between the RMS value of the bending wave signal and the reference value is greater than 1450, 1480 a threshold, then touch down is detected 1460, 1482. If the RMS value of the bending wave signal is not greater than 1450, 1480 the reference value, then no touch down is detected.

After touch down is detected 1482, the bending wave signal continues to be sampled 1486 (FIG. 14*c*) to determine lift off. The RMS value of the bending wave signal is calculated 1486. The RMS value of the sensed bending wave signal is compared to the reference value. If the difference between the calculated RMS value and the reference value exceeds 1488 a lift off threshold, then lift off is not detected the lift off detection process continues as described in blocks 1484-1488. If the difference between the RMS value of the bending wave signal and the reference value falls below 1488 the lift off threshold, then lift off is detected 1490.

Although the example provided immediately above is based on the determination of an RMS value of the bending wave signal, other parameters and/or multiple parameters may be used to characterize the bending wave signal. In one scenario, multiple parameters may be used to characterize the spectrum over the bandwidth of the noise. For example, multiple RMS values may be used, each RMS value corresponding to a particular portion of the spectrum. Further, as previously discussed in connection with FIG. 13, the reference value or values may be updated periodically to adjust for gradual drift and/or abrupt changes in the touch system that are not related to a touch contact.

Use of a noise-like driving signal outlined above advantageously provides additional spatial information when compared to the single driving frequency example described in connection with FIGS. 12a and 12b-12c. The additional spatial information may lead to greater uniformity of response sensitivity over the area of the touch panel. Greater uniformity of response sensitivity may offset the requirement for parallel calculations in different frequency bands as mentioned above.

In some situations, other multi-frequency driving signal approaches may be advantageous. Use of a noise-like stimulus produces non-deterministic results with respect to touch down and lift off detection. A statistical average may be used to compensate for the non-deterministic results produced by the noise-like stimulation signal, however, the speed of the touch down and/or lift off response may be decreased as the signal is averaged over time. Further, an appreciable fraction of the bandwidth used for touch location determination may be used by lift off determination in this approach. Lift off detection using this approach may limit the information available for determining the location of the touch contact.

Figure 15A:
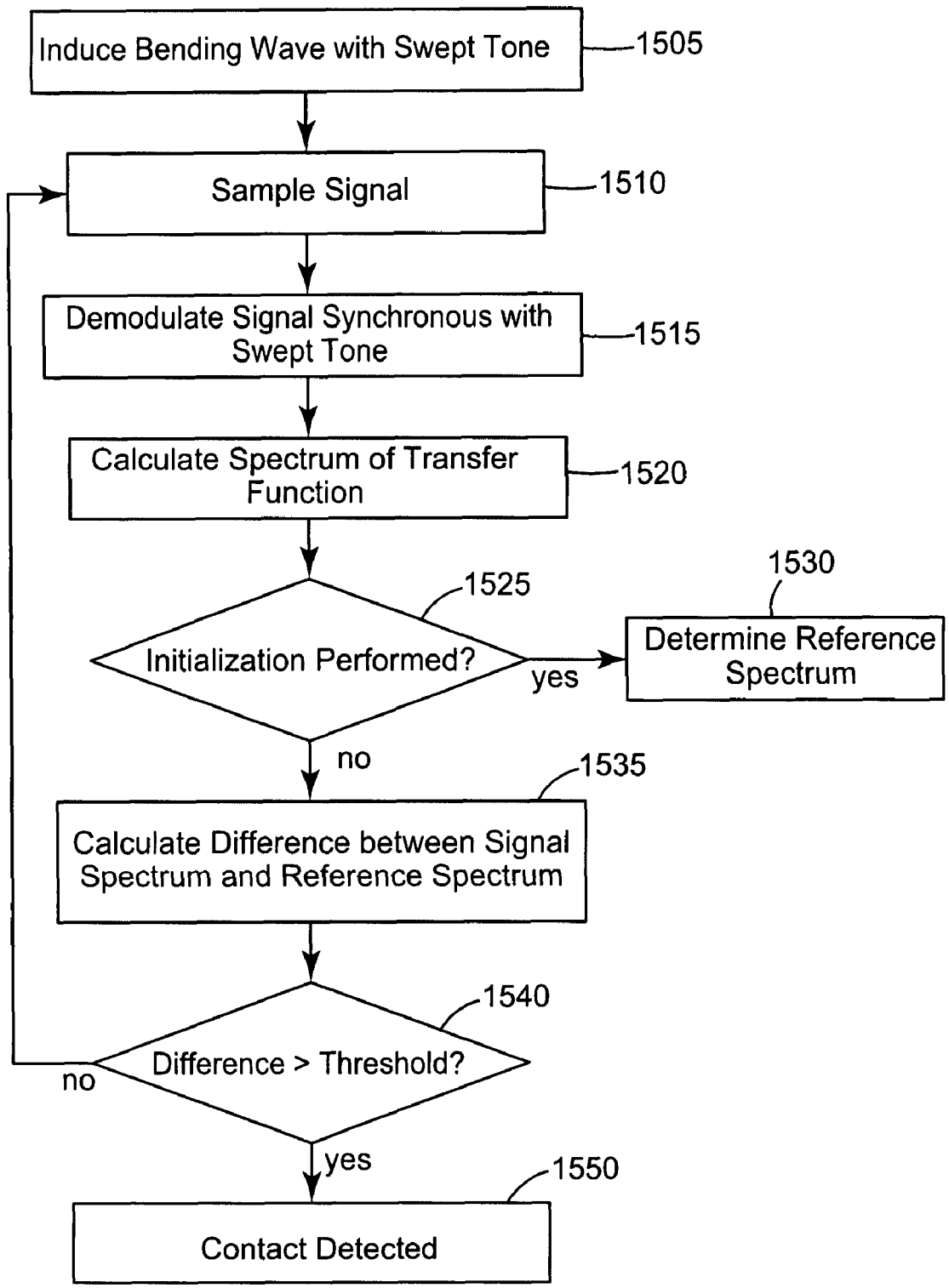
FIG. 15a is a flowchart of a touch down detection method employing a driving signal having a swept tone in accordance with embodiments of the invention.
Figure 15B:
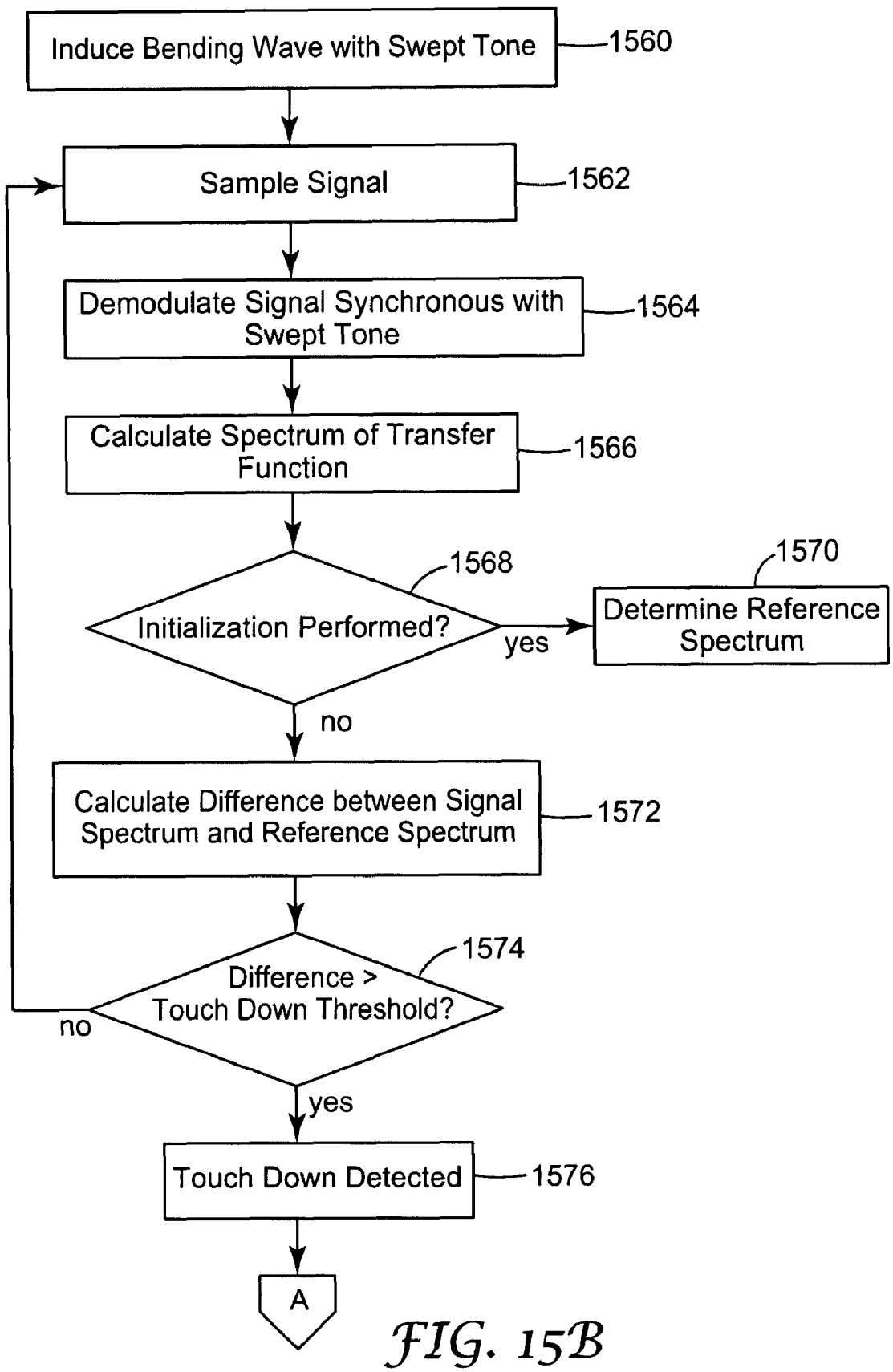
FIGS. 15b-15c are flowcharts of a lift off detection method employing a driving signal having a swept tone in accordance with embodiments of the invention.
Figure 15C:
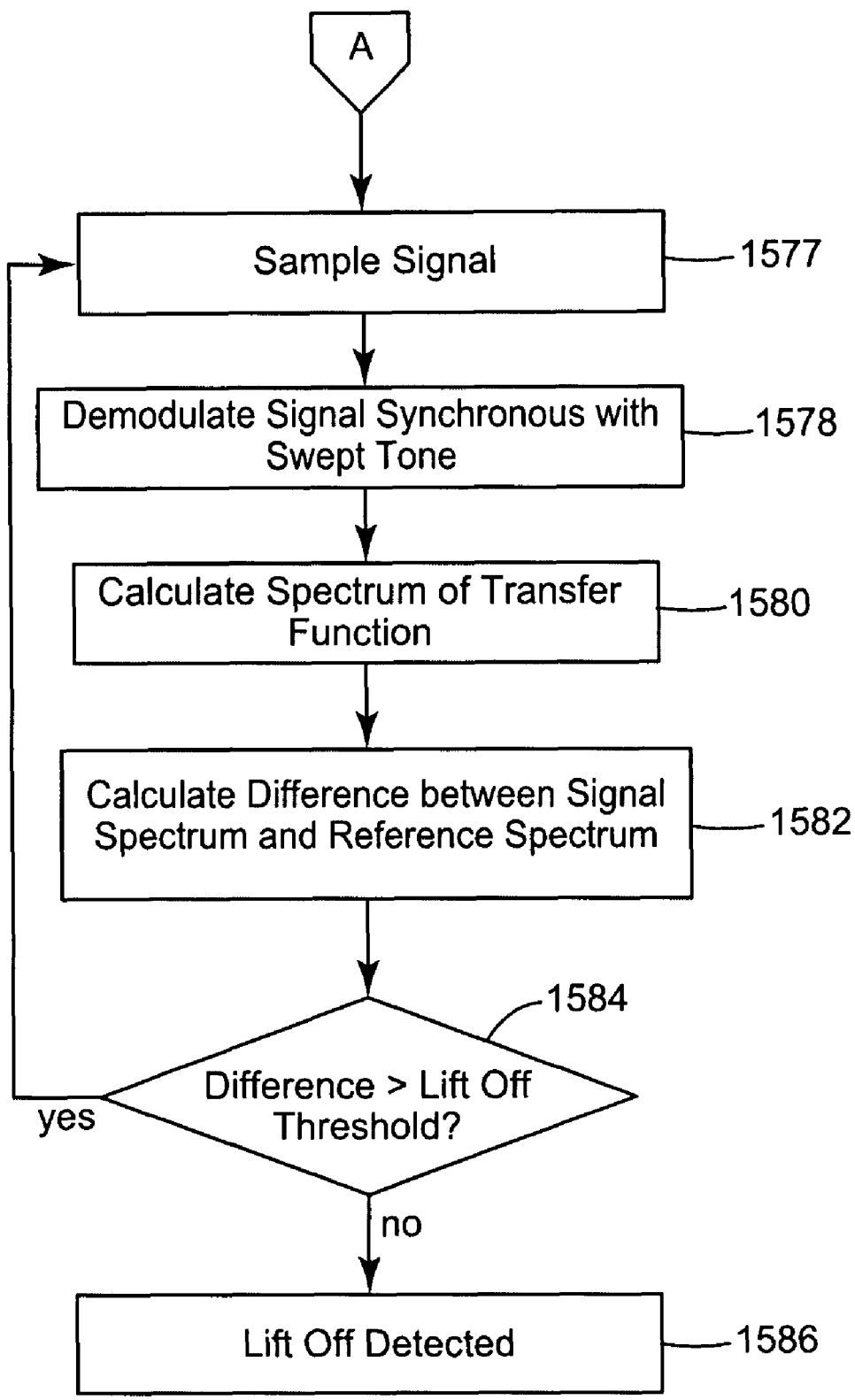

FIGS. 15a and 15b-15c are flowcharts of touch down and lift off detection methods, respectively, in accordance with embodiments of the invention. The methods illustrated in FIGS. 15a and 15b-15c employ a driving signal having a swept tone. The swept tone driving signal may be used to measure the spectrum of the touch panel over a given bandwidth. The sensed signal is demodulated synchronously with the swept tone driving signal. A bending wave signal produced by a swept tone driving signal is deterministic in nature and is relatively unaffected by a noise. The deterministic nature of the bending wave signal produced by a swept tone driving signal allows relatively fast measurement of the touch panel frequency response. This improves the speed and accuracy of the response relative to noise. However, in some situations, the use of a swept tone driving signal may limit the amount of information available for touch location determination processes.

Turning to the flowcharts of FIGS. 15a and 15b-15c, the emitting transducer induces 1505, 1560 bending waves in the touch panel using a swept tone driving signal, e.g., a multi-frequency driving signal with frequencies ranging from about 50 kHz to about 75 kHz. Sensing transducers sense the bending waves produced by the driving signal and generate a signal representative of the sensed bending waves. The sensed bending wave signal is sampled 1510, 1562 and may be filtered using a filter with a pass band compatible with the swept tone driving signal, in this example, a pass band of about 50 kHz to about 75 kHz. Preferably, a digital filter is used, however, analog filtering may alternatively be employed. The filtered bending wave signal is demodulated 1515, 1564 synchronous with the swept tone stimulus. Sweeping the emitting transducer through a frequency range and measuring the resultant bending wave signals from the sensing transducers allows the spectrum of the transfer function to be determined 1520, 1566.

If the system has previously been initialized 1525, 1568, then the determined spectrum is identified 1530, 1570 as the reference spectrum. The reference spectrum may be updated periodically to adjust for gradual drift and/or abrupt changes in the touch system that are not associated with a touch contact in a manner similar to that described above.

If a touch down occurs, the sensed spectrum is changed from the reference untouched condition spectrum. The difference in the spectrum is calculated 1535, 1572 relative to the reference spectrum. If the difference exceeds 1540, 1574 a threshold, then touch down is detected 1550, 1576. If the difference does not exceed the threshold, then no contact is detected.

After touch down is detected 1576, the bending wave signal continues to be sampled 1577 (FIG. 15c) for lift off determination. The signal is demodulated 1578 synchronous with the swept tone. The spectrum of the transfer function is calculated 1580. The difference between the transfer function spectrum and the reference spectrum is determined 1582. If the difference between the calculated spectrum and the reference spectrum exceeds 1584 a lift off threshold, then lift off is not detected the lift off detection process continues as described in blocks 1577-1582. If the difference between the calculated spectrum and the reference spectrum does not exceed 1584 the lift off threshold, then lift off is detected 1586.

Various embodiments described above involve the use of a driving signal having a frequency less than half the sampling frequency, $f_s$, used to sample the bending wave signal. In general, signals are sampled at a sampling rate in excess of twice the highest frequency to correctly capture information in the signal according to the Nyquist criterion. Analog to digital converters typically employ an anti-aliasing filter to limit the frequencies in excess of $f_s/2$.

The use of driving signals that produce bending wave signal frequencies exceeding the Nyquist criterion sampling frequency may be advantageously employed for touch detection. If a bending wave signal having a frequency in excess of $f_s/2$ is sampled, the sampled signal will be detected as an aliased signal at a lower frequency. The use of higher frequencies for touch detection may be used to reduce the spatial wavelength in the touch panel. Reducing the spatial wavelength reduces the variation in spatial sensitivity of the touch panel.

As previously discussed, variations in spatial sensitivity of the touch panel are particularly problematic if a small touch contact area is used, such as a touch by a pen or a fingernail. Variations in spatial sensitivity may cause a particular area to be more or less sensitive to the contact due to the spatial variation of the plate. This effect is reduced if the contact area is significant when compared to the wavelength of the touch panel at the driving signal frequency. Thus, a higher driving signal produces a shorter wavelength in the touch panel and correspondingly a smaller variation in spatial sensitivity allowing smaller area touch contacts to be reliably detected.

A driving frequency of involving higher frequency multiple or single tones may improve the spatial uniformity of the touch panel, producing enhanced touch-down and/or lift-off sensitivity. Aliased frequencies generated by driving frequencies above $f_s/2$ allow additional freedom in the choice of a set of multiple frequencies. Additionally, aliasing may be used to produce bending wave signals that are aliased to appear at the same frequency. An example set of such frequencies includes 50 kHz, 150 kHz, and 250 kHz when sampled at a sampling frequency of 200 kHz. In this example, both the 150 kHz frequency and the 250 kHz frequency produce aliased frequencies at 50 kHz when sampled at 200 kHz.

An advantage of using multiple driving frequencies appearing as the same frequency is that multiple frequencies may be processed with the same adaptive filter. The resultant bending wave signal will include more spatial information than a single frequency. The additional spatial information is acquired from the extra frequencies of the aliased signals sampled at the chosen in-band frequency. These multiple frequencies are likely to improve the uniformity sensitivity to touch down and lift off over the area of the touch panel. Because the same filter may be used to process the bending wave signal produced by the multiple frequencies, the aliased multiple frequency technique may be used to increase performance without an increase in the processing burden.

A further advantage of the aliasing techniques described herein is that the signal of interest may be tuned to a frequency band that was previously unavailable. For example, driving signals within or below the audio band, i.e., the frequency band below 20 kHz, are generally undesirable. Frequencies in the audio range may generate unwanted audible acoustic radiation from the induced vibration of the touch panel. Using aliasing, the transducer-induced bending wave signals may be tuned to a frequency in the audio band even though the driving signal has a frequency above the audio band. For example, a driving signal at 195 kHz sampled at 200 kHz will produce an aliased frequency at 5 kHz. This technique has the advantage of allowing the information to be aliased to a frequency band that is not required for touch location. Aliasing techniques may be applied to touch down and lift off detection methods involving single frequencies, multiple frequencies, swept tones, and/or broadband noise.

In accordance with one embodiment, aliasing may be used to produce a DC signal. In this example, a driving frequency equal to the sampling frequency is used. The relatively high driving frequency produces a small wavelength in the plate and improves touch sensitivity uniformity across the touch panel surface. After sampling, the bending wave signal produced with the emitting transducer operating at the driving frequency appears as a DC offset determined by the amplitude and phase of the bending wave signal. Such a dc level representation of the amplitude and phase of the bending wave signal is a similar approach to that employed in the adaptive filter method described earlier.

The use of a driving signal equal to the sampling frequency has several advantages. For example, the dc level produced after aliasing is relatively easy to generate, reduces the need for adaptive filtering and may be accomplished with a simpler design and less processing burden. In addition, the aliased signal does not interfere with the signal of interest for touch location determination. Additional frequencies may be used for the driving signal. The additional frequencies may be generated separately, or maybe created by the design of the distortion spectrum of the driving signal.

In the embodiments presented above, enhanced sensitivity to touch down and/or lift off involves the use of an emitting transducer. The emitting transducer induces bending waves used to characterize an untouched condition of the touch panel. The embodiments directed to increased sensitivity to touch down involve continuous operation of the emitting transducer. Embodiments of the invention directed to lift off detection may be used in combination with a wake on touch process. In these embodiments, the emitting transducer may be inoperative until triggered by a wake on touch signal.

Figure 16A:
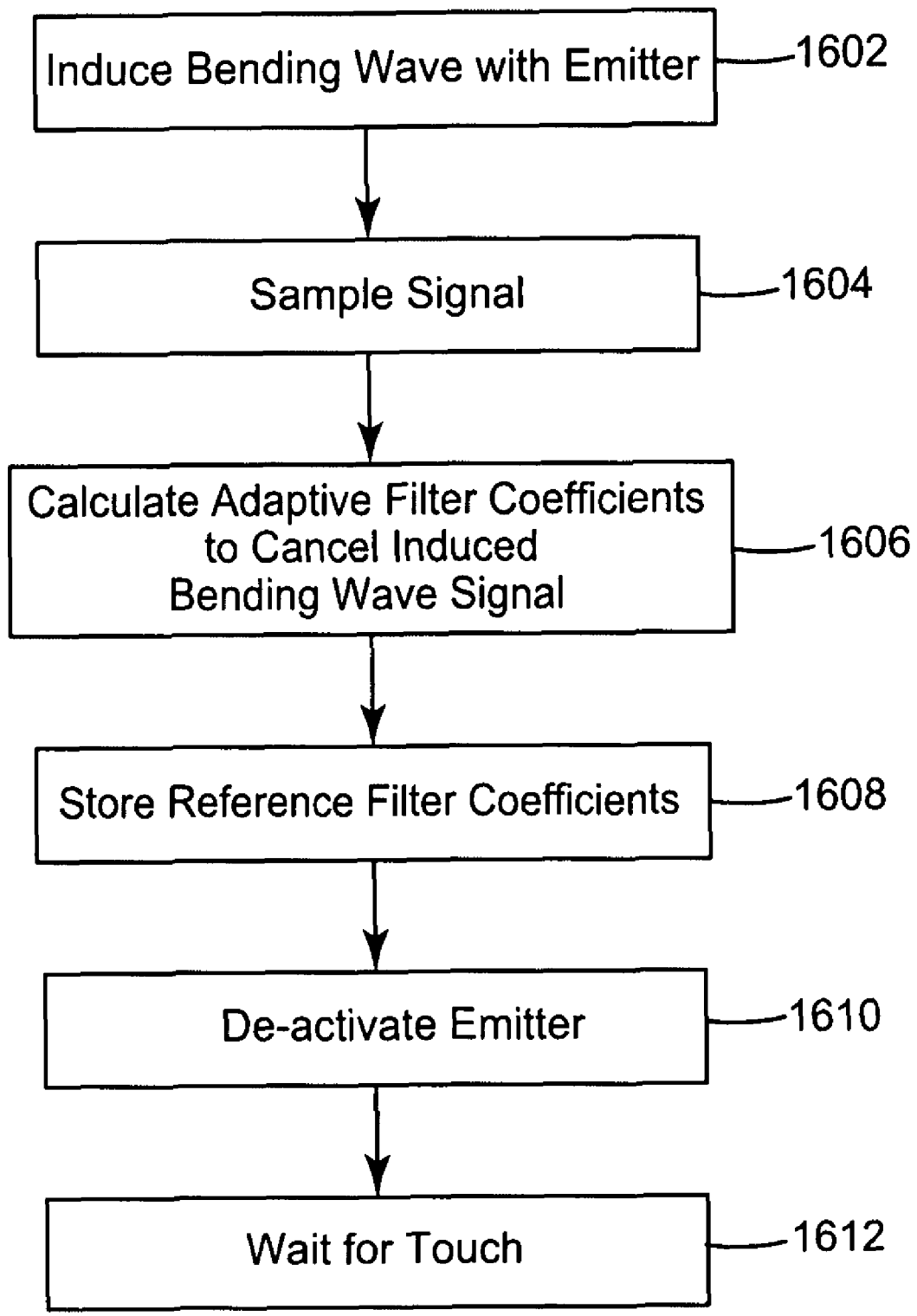
FIGS. 16a-16b are flowcharts illustrates lift off detection implemented in combination with wake on touch in accordance with embodiments of the invention.
Figure 16B:
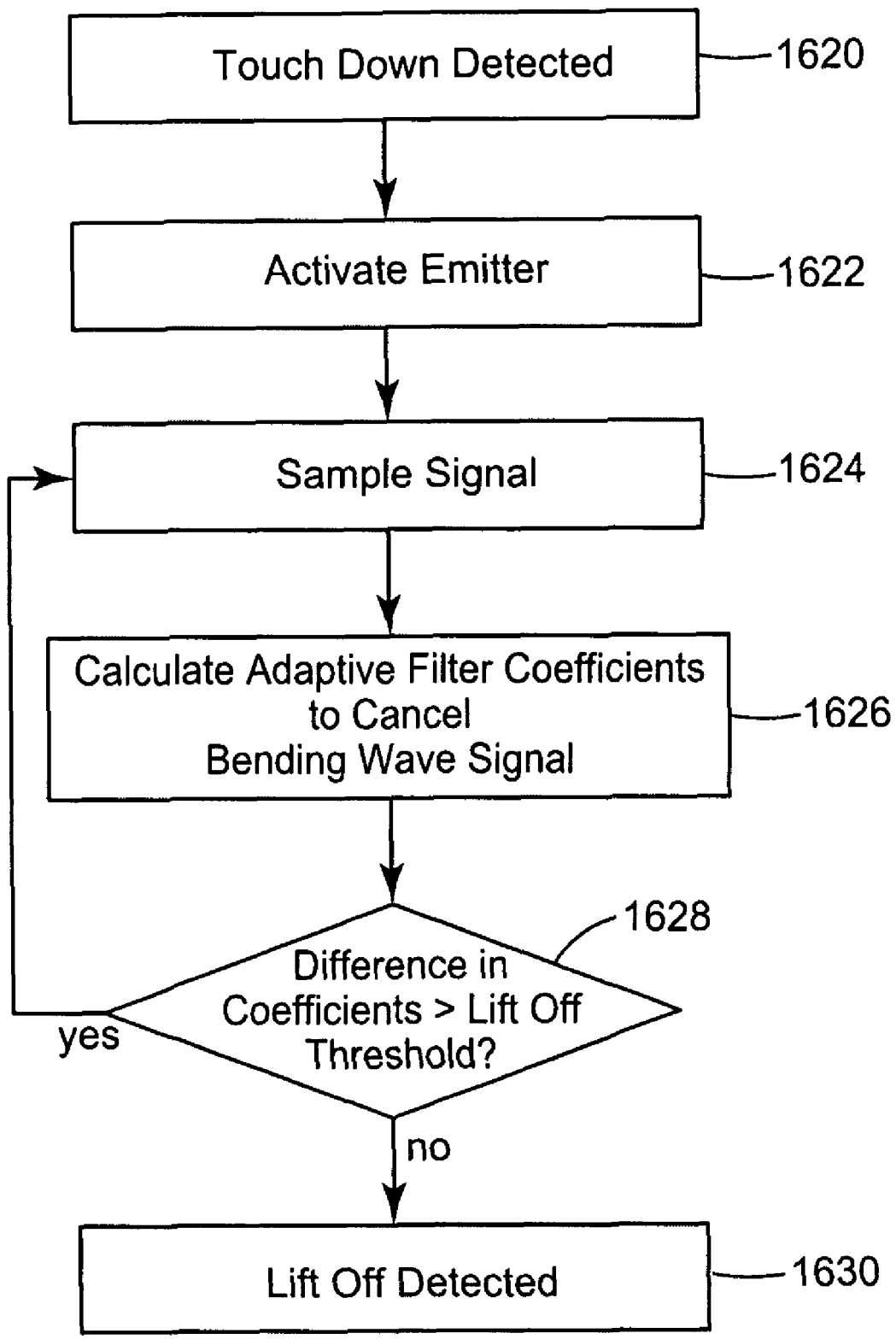

The flowcharts of FIGS. 16a-16b illustrate lift off detection implemented in combination with wake on touch. Any of the lift off detection examples described above may be modified to include a wake on touch feature. The method illustrated In FIGS. 16a and 16b uses the adaptive filter approach to detect changes in the bending wave signal lift off detection.

In this example, lift off detection with wake on touch involves an initialization process for determining the reference coefficients of the adaptive filter. The initialization process is illustrated in the flowchart of FIG. 16a. An emitting transducer induces 1602 bending waves in the touch panel using a driving signal operating at a single fundamental frequency, e.g., 50 kHz or other frequency value. A bending wave signal generated by the sensing transducers is sampled 1604 and applied to the input of an adaptive filter.

Filter coefficients that cancel the signal generated by induced bending waves are determined 1606. The filter coefficients represent the reference filter coefficients that cancel the untouched condition signal. The reference filter coefficients are stored 1608. After initialization, the emitter may be deactivated 1610 and the system waits for touch detection 1612.

Touch detection may be implemented using a passive approach. For example, with the emitting transducer deactivated, touch down may be detected if bending waves responsive to a touch on the touch panel produce bending wave signals beyond a threshold level. If the bending wave signals rise beyond the threshold level, a touch down is detected 1620 (FIG. 16b).

FIG. 16b is a flowchart illustrating a method of lift off detection with a wake on touch feature in accordance with embodiments of the invention. Following touch down detection 1620, e.g., by a passive approach, the emitting transducer is activated 1622 and operated at the selected frequency, 50 kHz in this example. The bending wave signal is sampled 1624. The filter coefficients are calculated 1626 to cancel the bending wave signal. The calculated filter coefficients are compared to the reference coefficients. If the difference between the calculated filter coefficients and the reference filter coefficients exceeds 1628 a lift off threshold, then lift off is not detected the lift off detection process continues as described in blocks 1624-1626 continues. If the difference between the calculated filter coefficients and the reference filter coefficients does not exceed 1628 the lift off threshold, then lift off is detected 1630.

Figure 17:
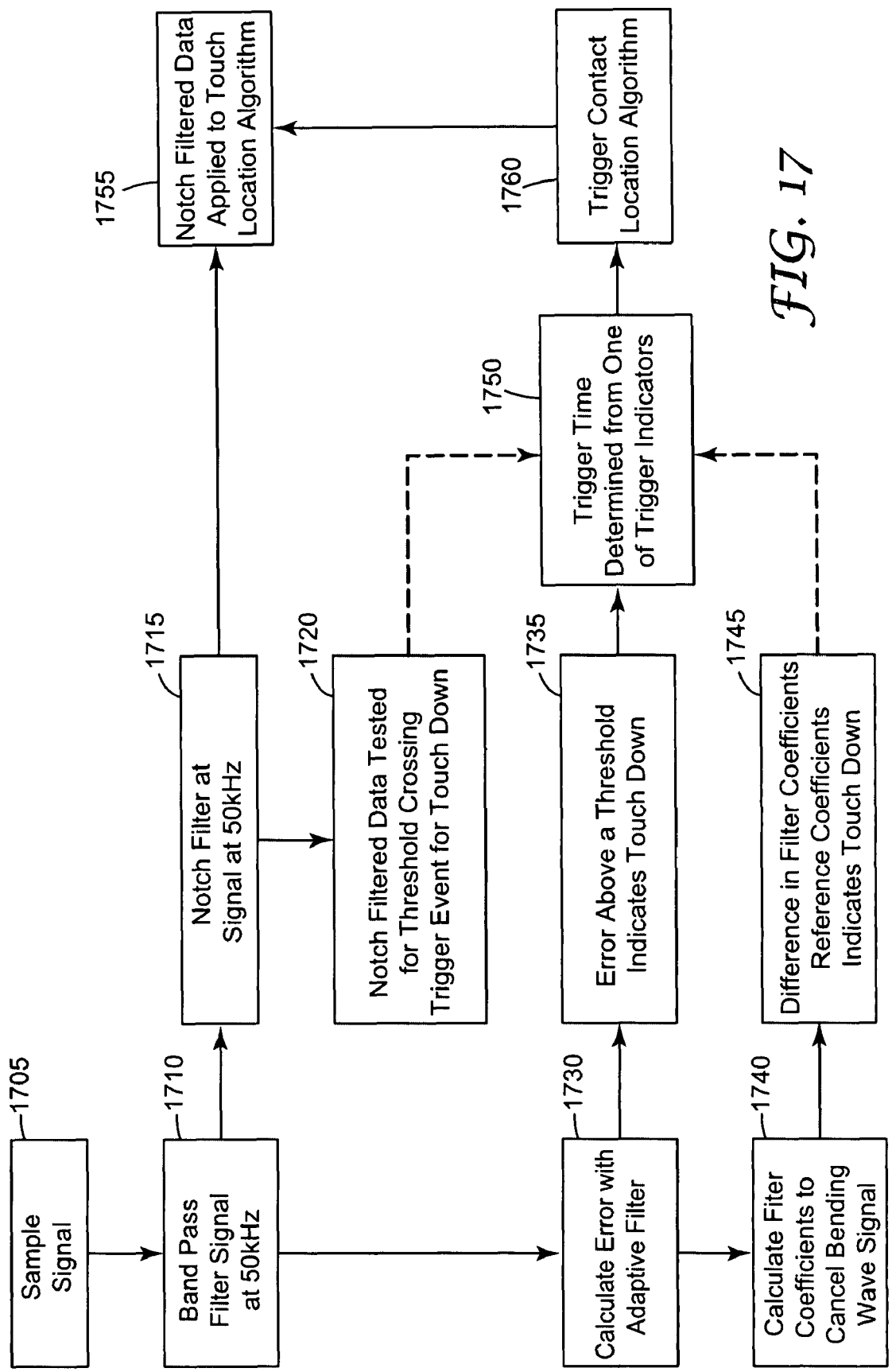
FIG. 17 is process flow diagram illustrating a touch down detection methodology employing multiple touch down detection techniques in accordance with embodiments of the invention.

The touch down detection processes based on an active emitter described above may be used in combination with other types of touch down detection methodologies. FIG. 17 is process flow diagram illustrating a touch down detection methodology employing multiple touch down detection techniques in accordance with embodiments of the invention.

The emitting transducer is energized by a driving signal. In this example, the emitting transducer is operated at a frequency of 50 kHz, although other single or multiple frequencies may be used. The induced bending wave generates an untouched condition signal. Reference conditions are identified characterizing the untouched condition signal.

The bending wave signal is sampled 1710 and band pass filtered 1710 at 50 kHz. The signal is notch filtered 1715 at 50 kHz. Notch filtering the signal at 50 kHz removes the portion of the signal corresponding to the induced bending wave. If the notch filtered signal exceeds a touch down threshold, then touch down is detected 1720.

The band pass filtered signal is applied to an adaptive filter to determine 1730 the error. One output of the adaptive filter is the error function. The error function provides the difference between the output of the adaptive filter, which predicts the value of the next sample, and the measured value of the next sample. This error is minimized by the adaptation process, however, changes in the system give rise to transients in the error function. Therefore when the error is above a threshold value, then touch down is detected 1735. The adaptive filter coefficients required to cancel the bending wave signal are calculated 1740. If the difference between the calculated filter coefficients and the reference coefficients is above a threshold, then touch down is detected 1745.

If touch down is detected by any of the touch down processes 1720, 1735, 1745, then the time of the touch is established 1750 based on the touch down time. Touch down detection is used to trigger 1760 activation of the touch location algorithm. The touch location is determined 1755 using the notch filtered data.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A touch sensing device, comprising:
    a touch panel;
    a transducer coupled to the touch panel and configured to induce bending waves in the touch panel;
    a plurality of sensors coupled to the touch panel, the plurality of sensors configured to sense the induced bending waves and generate an untouched condition signal responsive to the induced bending waves, the plurality of sensors further configured to sense bending waves modified by a touch on the touch panel and to generate a bending wave signal responsive to the bending waves modified by the touch; and
    a controller coupled to the plurality of sensors, the controller configured to compare the untouched condition signal to the bending wave signal after the signals are corrected for frequency dispersion, and to detect a touch on the touch panel based on the comparison.

2. A touch sensing device, comprising:
    a touch panel;
    a transducer coupled to the touch panel and configured to induce bending waves in the touch panel, the transducer being configured to induce bending waves in the touch panel at a frequency greater than or equal to half the sampling frequency used by the controller;
    a plurality of sensors coupled to the touch panel, the plurality of sensors configured to sense the induced bending waves and generate an untouched condition signal responsive to the induced bending waves, the plurality of sensors further configured to sense bending waves modified by a touch on the touch panel and to generate a bending wave signal responsive to the bending waves modified by the touch; and
    a controller coupled to the plurality of sensors, the controller configured to compare the untouched condition signal to the bending wave signal after the signals are corrected for frequency dispersion, and to detect a touch on the touch panel based on the comparison.

3. A touch sensing device, comprising:
    a touch panel;
    a transducer coupled to the touch panel and configured to induce bending waves in the touch panel, the transducer being configured to induce bending waves in the touch panel at a frequency associated with an aliased untouched condition signal;
    a plurality of sensors coupled to the touch panel, the plurality of sensors configured to sense the induced bending waves and generate an untouched condition signal responsive to the induced bending waves, the plurality of sensors further configured to sense bending waves modified by a touch on the touch panel and to generate a bending wave signal responsive to the bending waves modified by the touch; and
    a controller coupled to the plurality of sensors, the controller configured to compare the untouched condition signal to the bending wave signal after the signals are corrected for frequency dispersion, and to detect a touch on the touch panel based on the comparison.

4. The device of claim 3, wherein the aliased untouched condition signal comprises a signal having a frequency less than or equal to an audio band frequency.

5. The device of claim 3, wherein the aliased untouched condition signal comprises a DC signal.

6. The device of claim 1, wherein the controller is configure to compare the untouched condition signal and the bending wave signal by comparing reference filter coefficients selected to cancel the untouched condition signal to filter coefficients calculated to cancel the bending wave signal.

7. A touch system, comprising:
    a touch screen, comprising:
        a touch panel;
        a transducer coupled to the touch panel and configured to induce bending waves in the touch panel;
        a plurality of sensors coupled to the touch panel, the plurality of sensors configured to sense the induced bending waves and generate an untouched condition signal responsive to the induced bending waves, the plurality of sensors further configured to sense bending waves modified by a touch on the touch panel and to generate a bending wave signal responsive to the bending waves modified by the touch; and
        a controller coupled to the plurality of sensors, the controller configured to compare the untouched condition signal to the bending wave signal after correcting the signals for frequency dispersion, and detect a touch on the touch panel based on the comparison;
    a display viewable through the touch screen and configured to display information; and
    a processor coupled to the display and configured to process the information to be displayed on the display.

8. The touch system of claim 7, wherein the display comprises a light emitting diode display, a liquid crystal display, or a cathode ray tube display.

9. A method for determining touch information, comprising:
    inducing bending waves in a touch panel using a driving signal;
    generating an untouched condition signal associated with the induced bending waves;
    generating a bending wave signal modified by a touch on the touch panel;
    comparing the bending wave signal and the untouched condition signal after the signals are corrected for frequency dispersion; and
    detecting the touch on the touch panel based on the comparison.

10. The method of claim 9, wherein inducing the bending waves in the touch panel using the driving signal comprises inducing the bending waves in the touch panel using a driving signal associated with an aliased untouched condition signal.

11. The method of claim 9, further comprising updating the untouched condition signal based on non-touch related conditions.

12. The method of claim 9, further comprising updating the untouched condition signal due to component drift.

13. The method of claim 9, wherein comparing the bending wave signal and the untouched condition signal comprises comparing an amplitude of the untouched condition signal to an amplitude of the bending wave signal.

14. The method of claim 9, wherein comparing the bending wave signal and the untouched condition signal comprises comparing a spectrum of the untouched condition signal to a spectrum of the bending wave signal.

15. The method of claim 9, wherein comparing the bending wave signal and the untouched condition signal comprises:
   calculating reference filter coefficients that cancel the untouched condition signal;
   calculating filter coefficients that cancel the bending wave signal; and
   comparing the filter coefficients of the bending wave signal to the reference filter coefficients.

16. The method of claim 9, further comprising:
   comparing the bending wave signal and the untouched condition signal after the touch is detected; and
   detecting a touch lift off from the touch panel based on the comparison.

17. A touch sensing method, comprising:
   detecting a touch on a touch panel by one or more of a plurality of touch detection processes, at least one of the plurality of touch detection processes based on a signal generated in response to a bending wave induced in the touch panel by a driving signal and corrected for frequency dispersion; and
   initiating a touch location process after detecting the touch;
   wherein the at least one touch detection process comprises:
      generating a bending wave signal modified by a touch on the touch panel;
      comparing the bending wave signal and the signal generated by the induced bending wave after the signals are corrected for frequency dispersion; and
      detecting the touch on the touch panel based on the comparison.

18. The method of claim 17, wherein comparing the bending wave signal and the signal generated by the induced bending wave comprises comparing filter coefficients calculated to cancel the bending wave signal modified by a touch to filter coefficients calculated to cancel the signal generated by the induced bending wave.

19. The method of claim 17, wherein comparing the bending wave signal and the signal generated by the induced bending wave comprises comparing an amplitude or spectrum of the bending wave signal to an amplitude or spectrum of the signal generated by the induced bending wave.

* * * * *

UNITED STATES PATENT AND TRADEMARK OFFICE
CERTIFICATE OF CORRECTION

| | | |
|---|---|---|
| PATENT NO. | : 8,217,917 B2 | Page 1 of 2 |
| APPLICATION NO. | : 11/865237 | |
| DATED | : July 10, 2012 | |
| INVENTOR(S) | : Nicholas P. Hill | |

It is certified that error appears in the above-identified patent and that said Letters Patent is hereby corrected as shown below:

Drawings
In the Drawings; Sheet 7 of 24; Box No. 104; Fig. 8;
    delete "Tranducer"
    and insert -- Transducer -- therefor.

In the Drawings; Sheet 24 of 24; Box No. 1740; Fig. 17;
    delete "Fiter"
    and insert -- Filter -- therefor.

Column 2
Line 22; delete "compared the"
    and insert -- compared to the -- therefor.
Line 41; delete "The Figures"
    and insert -- The figures -- therefor.

Column 18
Line 42; delete "compared 1440"
    and insert -- compared to 1440 -- therefor.

Column 20
Line 52; delete "touch-down"
    and insert -- touch down -- therefor.

Column 21
Line 60; delete "illustrated In"
    and insert -- illustrated in -- therefor.

Signed and Sealed this
Twenty-third Day of October, 2012

David J. Kappos
*Director of the United States Patent and Trademark Office*

Column 24
Claim 6; Line 9; delete "is configure"
and insert -- is configured -- therefor.